United States Patent
Brown et al.

(10) Patent No.: US 9,235,798 B2
(45) Date of Patent: Jan. 12, 2016

(54) METHODS AND SYSTEMS FOR HANDLING DATA RECEIVED BY A STATE MACHINE ENGINE

(75) Inventors: David R. Brown, Lucas, TX (US);
Harold B Noyes, Boise, ID (US);
Inderjit Singh Bains, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 619 days.

(21) Appl. No.: 13/552,479

(22) Filed: Jul. 18, 2012

(65) Prior Publication Data

US 2014/0025905 A1    Jan. 23, 2014

(51) Int. Cl.
*G06F 12/00* (2006.01)
*G06F 13/38* (2006.01)
*G06N 3/02* (2006.01)
*G06F 3/00* (2006.01)

(52) U.S. Cl.
CPC ....................... *G06N 3/02* (2013.01)

(58) Field of Classification Search
None
See application file for complete search history.

(56) References Cited

U.S. PATENT DOCUMENTS

| | | | |
|---|---|---|---|
| 5,287,523 A | 2/1994 | Allison et al. |
| 6,034,963 A | 3/2000 | Minami et al. |
| 7,392,229 B2 | 6/2008 | Harris et al. |
| 7,487,131 B2 | 2/2009 | Harris et al. |
| 7,487,542 B2 | 2/2009 | Boulanger |
| 7,774,286 B1 | 8/2010 | Harris |
| 7,917,684 B2 | 3/2011 | Noyes |
| 7,970,964 B2 | 6/2011 | Noyes |
| 8,065,249 B1 | 11/2011 | Harris et al. |
| 8,140,780 B2 | 3/2012 | Noyes |
| 2007/0280196 A1 | 12/2007 | Olgaard et al. |
| 2009/0204734 A1 | 8/2009 | Strait et al. |
| 2010/0100691 A1 | 4/2010 | Noyes |
| 2010/0100714 A1 | 4/2010 | Noyes |
| 2010/0115347 A1 | 5/2010 | Noyes |
| 2010/0118425 A1 | 5/2010 | Rafaelof |
| 2010/0138432 A1 | 6/2010 | Noyes |
| 2010/0138575 A1 | 6/2010 | Noyes |
| 2010/0138634 A1 | 6/2010 | Noyes |
| 2010/0138635 A1 | 6/2010 | Noyes |
| 2010/0174887 A1 | 7/2010 | Pawlowski |

(Continued)

FOREIGN PATENT DOCUMENTS

| | | |
|---|---|---|
| JP | 08087462 | 4/1996 |
| JP | 10069459 | 3/1998 |
| TW | 200912728 A | 3/2009 |

OTHER PUBLICATIONS

International Search Report and Written Opinion mailed Oct. 22, 2013 in counterpart Application No. PCT/US2013/049744 filed Jul. 9, 2013.

(Continued)

*Primary Examiner* — Scott Sun
(74) *Attorney, Agent, or Firm* — Fletcher Yoder, P.C.

(57) ABSTRACT

A data analysis system to analyze data. The data analysis system includes a data buffer configured to receive data to be analyzed. The data analysis system also includes a state machine lattice. The state machine lattice includes multiple data analysis elements and each data analysis element includes multiple memory cells configured to analyze at least a portion of the data and to output a result of the analysis. The data analysis system includes a buffer interface configured to receive the data from the data buffer and to provide the data to the state machine lattice.

25 Claims, 15 Drawing Sheets

(56) References Cited

U.S. PATENT DOCUMENTS

| | | |
|---|---|---|
| 2010/0174929 A1 | 7/2010 | Pawlowski |
| 2010/0175130 A1 | 7/2010 | Pawlowski |
| 2010/0185647 A1 | 7/2010 | Noyes |
| 2010/0332809 A1 | 12/2010 | Noyes |
| 2011/0145182 A1 | 6/2011 | Dlugosch |
| 2011/0145271 A1 | 6/2011 | Noyes |
| 2011/0145544 A1 | 6/2011 | Noyes |
| 2011/0219150 A1 | 9/2011 | Piccirillo et al. |
| 2011/0258360 A1 | 10/2011 | Noyes |
| 2011/0307433 A1 | 12/2011 | Dlugosch |
| 2011/0307503 A1 | 12/2011 | Dlugosch |
| 2012/0192163 A1 | 7/2012 | Glendenning |
| 2012/0192164 A1 | 7/2012 | Xu |
| 2012/0192165 A1 | 7/2012 | Xu |
| 2012/0192166 A1 | 7/2012 | Xu |
| 2013/0159671 A1* | 6/2013 | Brown et al. ............... 712/36 |

OTHER PUBLICATIONS

U.S. Appl. No. 13/327,510, filed Dec. 15, 2011, Noyes.
U.S. Appl. No. 13/327,580, filed Dec. 15, 2011, Brown.
U.S. Appl. No. 13/327,591, filed Dec. 15, 2011, Brown.
U.S. Appl. No. 13/327,623, filed Dec. 15, 2011, Brown.
U.S. Appl. No. 13/327,499, filed Dec. 15, 2011, Noyes.
U.S. Appl. No. 13/425,137, filed Mar. 20, 2012, Noyes.
U.S. Appl. No. 13/552,488, filed Jul. 18, 2012, Brown.
U.S. Appl. No. 13/552,492, filed Jul. 18, 2012, Noyes.
TW Application No. 102125814 Office Action dated Mar. 26, 2015.

* cited by examiner

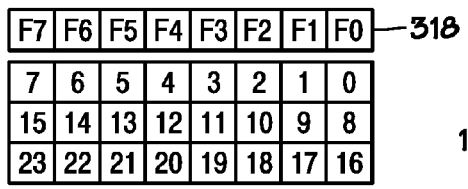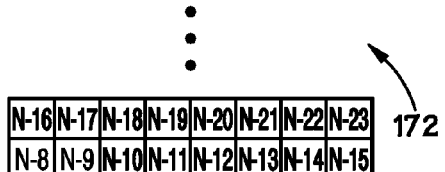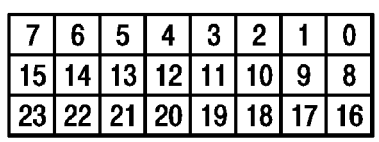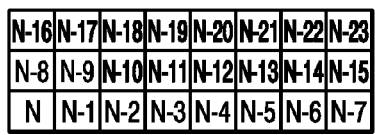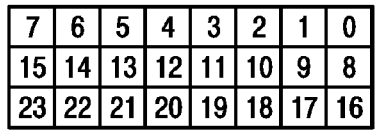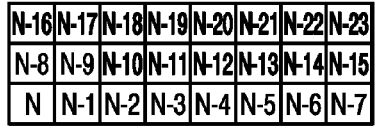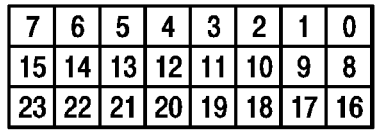
FIG. 15
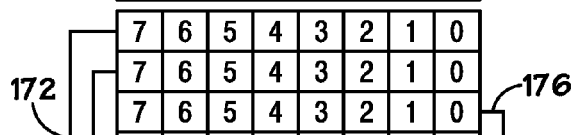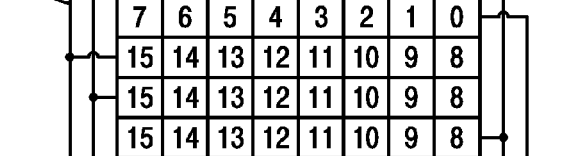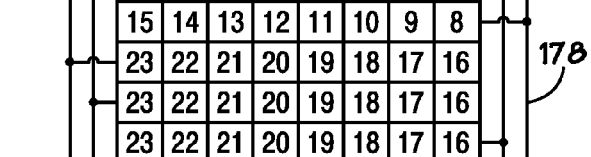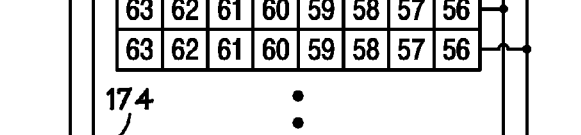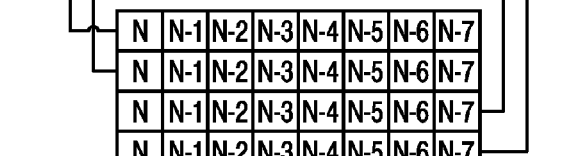
FIG. 16

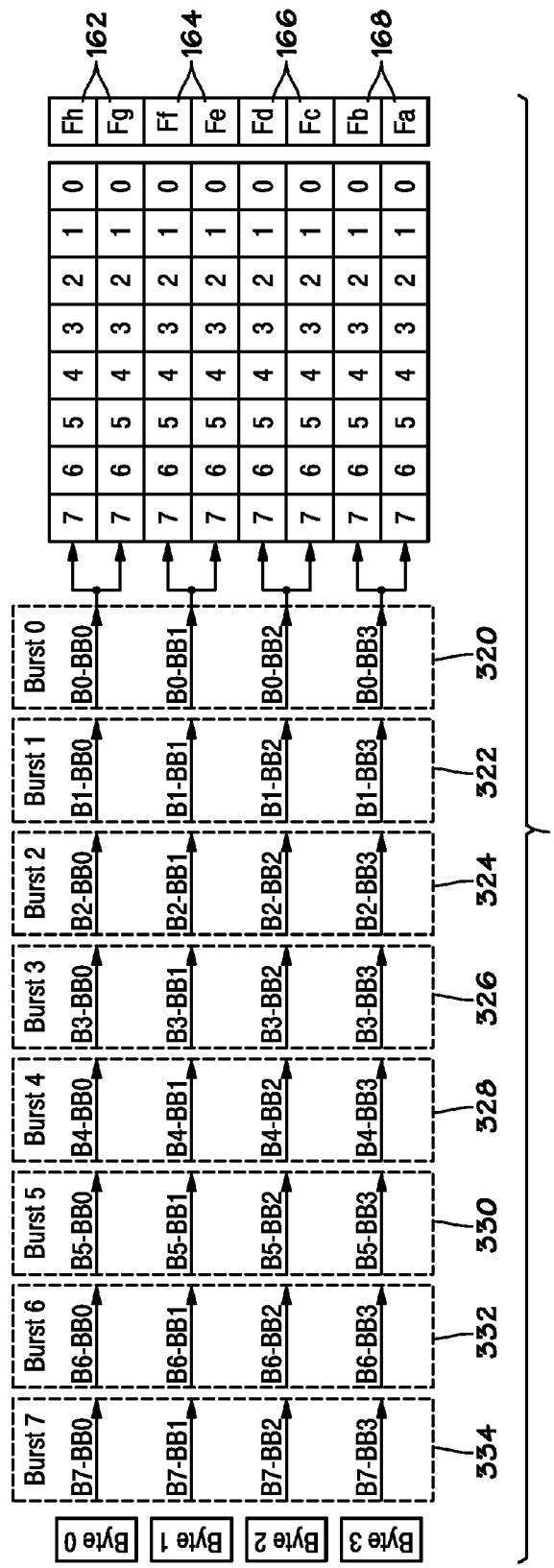

METHODS AND SYSTEMS FOR HANDLING DATA RECEIVED BY A STATE MACHINE ENGINE

BACKGROUND

1. Field of Invention

Embodiments of the invention relate generally to electronic devices and, more specifically, in certain embodiments, to electronic devices with parallel devices for data analysis.

2. Description of Related Art

Complex data analysis (e.g., pattern recognition) can be inefficient to perform on a conventional von Neumann based computer. A biological brain, in particular a human brain, however, is adept at performing complex data analysis. Current research suggests that a human brain performs data analysis using a series of hierarchically organized neuron layers in the neocortex. Neurons in the lower layers of the hierarchy analyze "raw signals" from, for example, sensory organs, while neurons in higher layers analyze signal outputs from neurons in the lower levels. This hierarchical system in the neocortex, possibly in combination with other areas of the brain, accomplishes the complex data analysis that enables humans to perform high level functions such as spatial reasoning, conscious thought, and complex language.

In the field of computing, pattern recognition tasks, for example, are increasingly challenging. Ever larger volumes of data are transmitted between computers, and the number of patterns that users wish to detect is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often is unable to process adequate amounts of data in an amount of time given. Some devices configured to search a data stream do so by distributing the data stream among a plurality of circuits. The circuits each determine whether the data stream matches a portion of a pattern. Often, a large number of circuits operate in parallel, each searching the data stream at generally the same time. However, there has not been a system that effectively allows for performing complex data analysis in a manner more comparable to that of a biological brain. Development of such a system is desirable.

BRIEF DESCRIPTION OF DRAWINGS

FIG. 15 illustrates an example of data blocks received by state machine engines, according to various embodiments of the invention.

FIG. 16 illustrates an example of the data blocks of FIG. 15 stored in a data buffer system of state machine engines, according to various embodiments of the invention.

FIG. 18 illustrates an example of data being provided into multiple logical groups, according to various embodiments of the invention.

DETAILED DESCRIPTION

Figure 1:
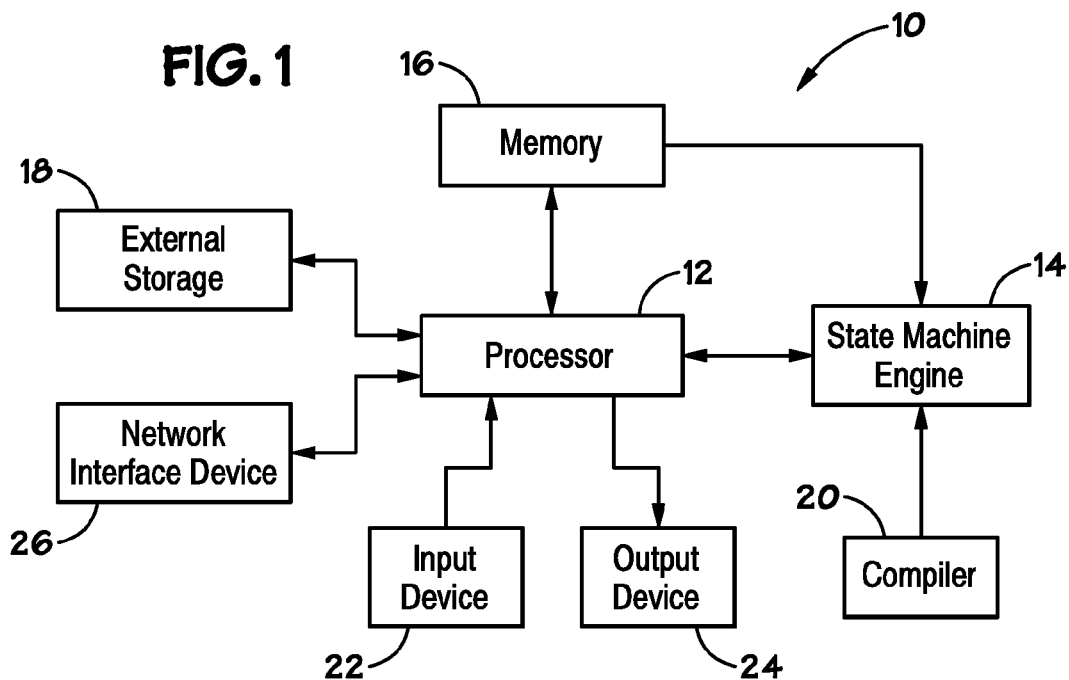
FIG. 1 illustrates an example of system having a state machine engine, according to various embodiments of the invention.

Turning now to the figures, FIG. 1 illustrates an embodiment of a processor-based system, generally designated by reference numeral 10. The system 10 (e.g., data analysis system) may be any of a variety of types such as a desktop computer, laptop computer, pager, cellular phone, personal organizer, portable audio player, control circuit, camera, etc. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

In a typical processor-based device, such as the system 10, a processor 12, such as a microprocessor, controls the processing of system functions and requests in the system 10. Further, the processor 12 may comprise a plurality of processors that share system control. The processor 12 may be coupled directly or indirectly to each of the elements in the system 10, such that the processor 12 controls the system 10 by executing instructions that may be stored within the system 10 or external to the system 10.

In accordance with the embodiments described herein, the system 10 includes a state machine engine 14, which may operate under control of the processor 12. As used herein, the state machine engine 14 refers to a single device (e.g., single chip). The state machine engine 14 may employ any automaton theory. For example, the state machine engine 14 may employ one of a number of state machine architectures, including, but not limited to Mealy architectures, Moore architectures, Finite State Machines (FSMs), Deterministic FSMs (DFSMs), Bit-Parallel State Machines (BPSMs), etc. Though a variety of architectures may be used, for discussion purposes, the application refers to FSMs. However, those skilled in the art will appreciate that the described techniques may be employed using any one of a variety of state machine architectures.

As discussed further below, the state machine engine 14 may include a number of (e.g., one or more) finite state machine (FSM) lattices (e.g., core of a chip). For purposes of this application the term "lattice" refers to an organized framework (e.g., routing matrix, routing network, frame) of elements (e.g., Boolean cells, counter cells, state machine elements, state transition elements). Furthermore, the "lattice" may have any suitable shape, structure, or hierarchical organization (e.g., grid, cube, spherical, cascading). Each FSM lattice may implement multiple FSMs that each receive and analyze the same data in parallel. Further, the FSM lattices may be arranged in groups (e.g., clusters), such that clusters of FSM lattices may analyze the same input data in parallel. Further, clusters of FSM lattices of the state machine engine 14 may be arranged in a hierarchical structure wherein outputs from state machine lattices on a lower level of the hierarchical structure may be used as inputs to state machine lattices on a higher level. By cascading clusters of parallel FSM lattices of the state machine engine 14 in series through the hierarchical structure, increasingly complex patterns may be analyzed (e.g., evaluated, searched, etc.).

Further, based on the hierarchical parallel configuration of the state machine engine 14, the state machine engine 14 can be employed for complex data analysis (e.g., pattern recognition) in systems that utilize high processing speeds. For instance, embodiments described herein may be incorporated in systems with processing speeds of 1 GByte/sec. Accordingly, utilizing the state machine engine 14, data from high speed memory devices or other external devices may be rapidly analyzed. The state machine engine 14 may analyze a data stream according to several criteria (e.g., search terms), at about the same time, e.g., during a single device cycle. Each of the FSM lattices within a cluster of FSMs on a level of the state machine engine 14 may each receive the same search term from the data stream at about the same time, and each of the parallel FSM lattices may determine whether the term advances the state machine engine 14 to the next state in the processing criterion. The state machine engine 14 may analyze terms according to a relatively large number of criteria, e.g., more than 100, more than 110, or more than 10,000. Because they operate in parallel, they may apply the criteria to a data stream having a relatively high bandwidth, e.g., a data stream of greater than or generally equal to 1 GByte/sec, without slowing the data stream.

In one embodiment, the state machine engine 14 may be configured to recognize (e.g., detect) a great number of patterns in a data stream. For instance, the state machine engine 14 may be utilized to detect a pattern in one or more of a variety of types of data streams that a user or other entity might wish to analyze. For example, the state machine engine 14 may be configured to analyze a stream of data received over a network, such as packets received over the Internet or voice or data received over a cellular network. In one example, the state machine engine 14 may be configured to analyze a data stream for spam or malware. The data stream may be received as a serial data stream, in which the data is received in an order that has meaning, such as in a temporally, lexically, or semantically significant order. Alternatively, the data stream may be received in parallel or out of order and, then, converted into a serial data stream, e.g., by reordering packets received over the Internet. In some embodiments, the data stream may present terms serially, but the bits expressing each of the terms may be received in parallel. The data stream may be received from a source external to the system 10, or may be formed by interrogating a memory device, such as the memory 16, and forming the data stream from data stored in the memory 16. In other examples, the state machine engine 14 may be configured to recognize a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase. The stream of data to be analyzed may include multiple bits of data in a binary format or other formats, e.g., base ten, ASCII, etc. The stream may encode the data with a single digit or multiple digits, e.g., several binary digits.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, that may provide data to be analyzed by the state machine engine 14. As used herein, the term "provide" may generically refer to direct, input, insert, send, transfer, transmit, generate, give, output, place, write, etc. Such devices may be referred to as or include solid state drives (SSD's), MultimediaMediaCards (MMC's), SecureDigital (SD) cards, CompactFlash (CF) cards, or any other suitable device. Further, it should be appreciated that such devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12. Additionally, the system 10 may include an external storage 18, such as a magnetic storage device. The external storage may also provide input data to the state machine engine 14.

The system 10 may include a number of additional elements. For instance, a compiler 20 may be used to configure (e.g., program) the state machine engine 14, as described in more detail with regard to FIG. 8. An input device 22 may also be coupled to the processor 12 to allow a user to input data into the system 10. For instance, an input device 22 may be used to input data into the memory 16 for later analysis by the state machine engine 14. The input device 22 may include buttons, switching elements, a keyboard, a light pen, a stylus, a mouse, and/or a voice recognition system, for instance. An output device 24, such as a display may also be coupled to the processor 12. The display 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

FIGS. 2-5 illustrate an example of a FSM lattice 30. In an example, the FSM lattice 30 comprises an array of blocks 32. As will be described, each block 32 may include a plurality of selectively couple-able hardware elements (e.g., configurable elements and/or special purpose elements) that correspond to a plurality of states in a FSM. Similar to a state in a FSM, a hardware element can analyze an input stream and activate a downstream hardware element, based on the input stream.

The configurable elements can be configured (e.g., programmed) to implement many different functions. For instance, the configurable elements may include state machine elements (SMEs) 34, 36 (shown in FIG. 5) that are hierarchically organized into rows 38 (shown in FIGS. 3 and 4) and blocks 32 (shown in FIGS. 2 and 3). The SMEs may also be considered state transition elements (STEs). To route signals between the hierarchically organized SMEs 34, 36, a hierarchy of configurable switching elements can be used, including inter-block switching elements 40 (shown in FIGS. 2 and 3), intra-block switching elements 42 (shown in FIGS. 3 and 4) and intra-row switching elements 44 (shown in FIG. 4).

As described below, the switching elements may include routing structures and buffers. A SME 34, 36 can correspond to a state of a FSM implemented by the FSM lattice 30. The SMEs 34, 36 can be coupled together by using the configurable switching elements as described below. Accordingly, a FSM can be implemented on the FSM lattice 30 by configuring the SMEs 34, 36 to correspond to the functions of states and by selectively coupling together the SMEs 34, 36 to correspond to the transitions between states in the FSM.

Figure 2:
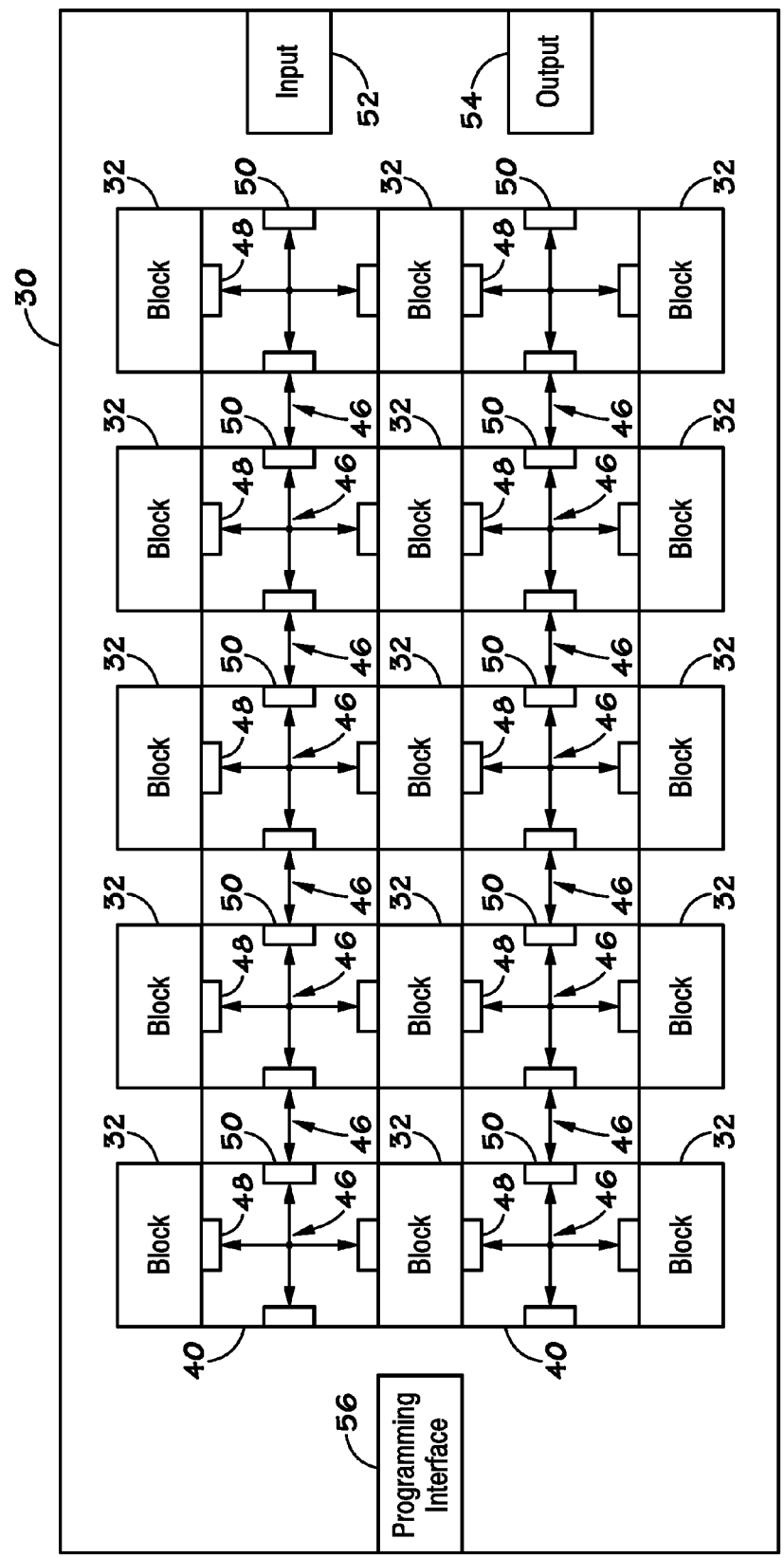
FIG. 2 illustrates an example of a finite state machine (FSM) lattice of the state machine engine of FIG. 1, according to various embodiments of the invention.

FIG. 2 illustrates an overall view of an example of a FSM lattice 30. The FSM lattice 30 includes a plurality of blocks 32 that can be selectively coupled together with configurable inter-block switching elements 40. The inter-block switching elements 40 may include conductors 46 (e.g., wires, traces, etc.) and buffers 48 and 50. In an example, buffers 48 and 50 are included to control the connection and timing of signals to/from the inter-block switching elements 40. As described further below, the buffers 48 may be provided to buffer data being sent between blocks 32, while the buffers 50 may be provided to buffer data being sent between inter-block switching elements 40. Additionally, the blocks 32 can be selectively coupled to an input block 52 (e.g., a data input port) for receiving signals (e.g., data) and providing the data to the blocks 32. The blocks 32 can also be selectively coupled to an output block 54 (e.g., an output port) for providing signals from the blocks 32 to an external device (e.g., another FSM lattice 30). The FSM lattice 30 can also include a programming interface 56 to configure (e.g., via an image, program) the FSM lattice 30. The image can configure (e.g., set) the state of the SMEs 34, 36. That is, the image can configure the SMEs 34, 36 to react in a certain way to a given input at the input block 52. For example, a SME 34, 36 can be set to output a high signal when the character 'a' is received at the input block 52.

In an example, the input block 52, the output block 54, and/or the programming interface 56 can be implemented as registers such that writing to or reading from the registers provides data to or from the respective elements. Accordingly, bits from the image stored in the registers corresponding to the programming interface 56 can be loaded on the SMEs 34, 36. Although FIG. 2 illustrates a certain number of conductors (e.g., wire, trace) between a block 32, input block 52, output block 54, and an inter-block switching element 40, it should be understood that in other examples, fewer or more conductors may be used.

Figure 3:
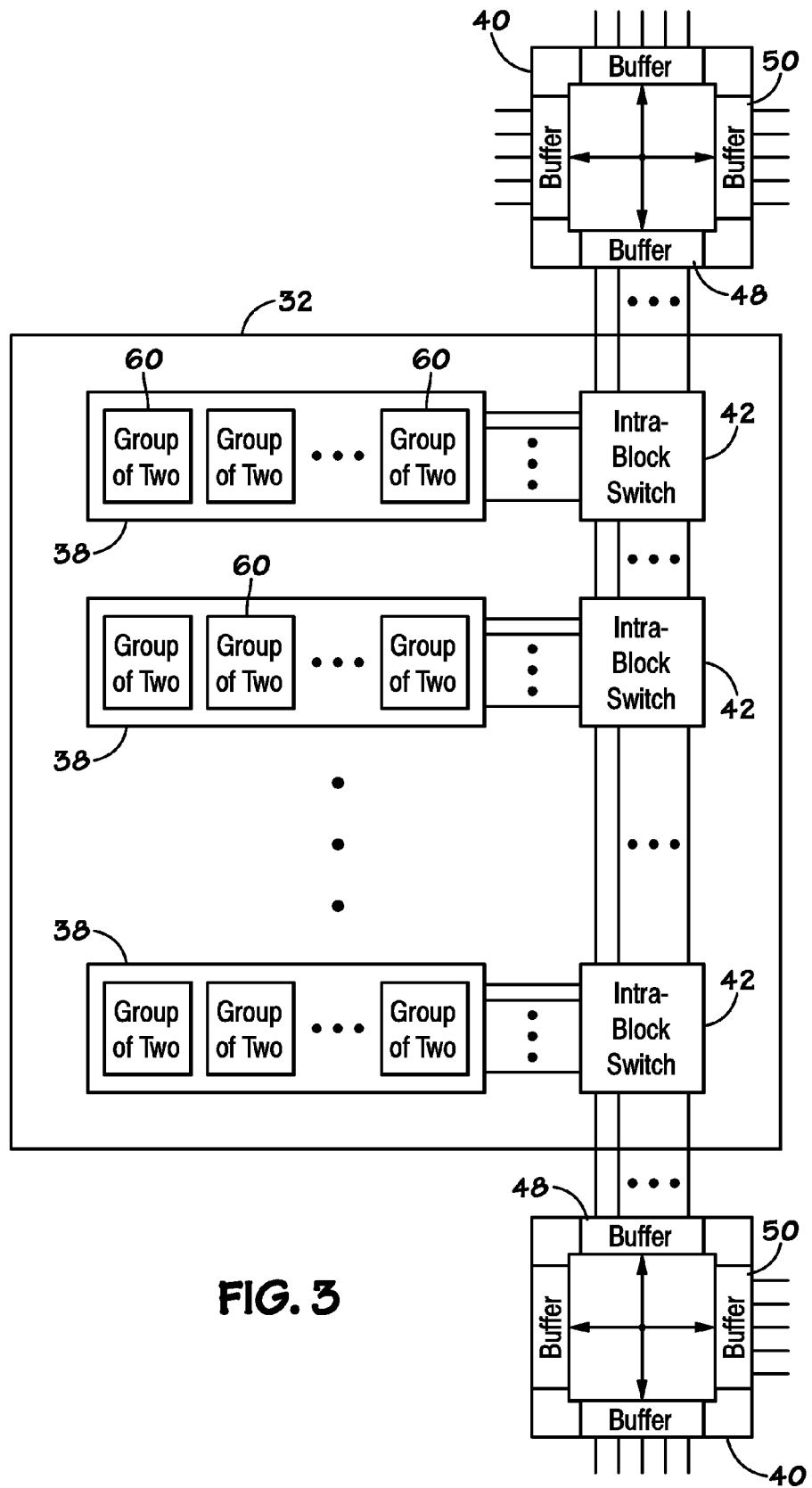
FIG. 3 illustrates an example of a block of the FSM lattice of FIG. 2, according to various embodiments of the invention.

FIG. 3 illustrates an example of a block 32. A block 32 can include a plurality of rows 38 that can be selectively coupled together with configurable intra-block switching elements 42. Additionally, a row 38 can be selectively coupled to another row 38 within another block 32 with the inter-block switching elements 40. A row 38 includes a plurality of SMEs 34, 36 organized into pairs of elements that are referred to herein as groups of two (GOTs) 60. In an example, a block 32 comprises sixteen (16) rows 38.

Figure 4:
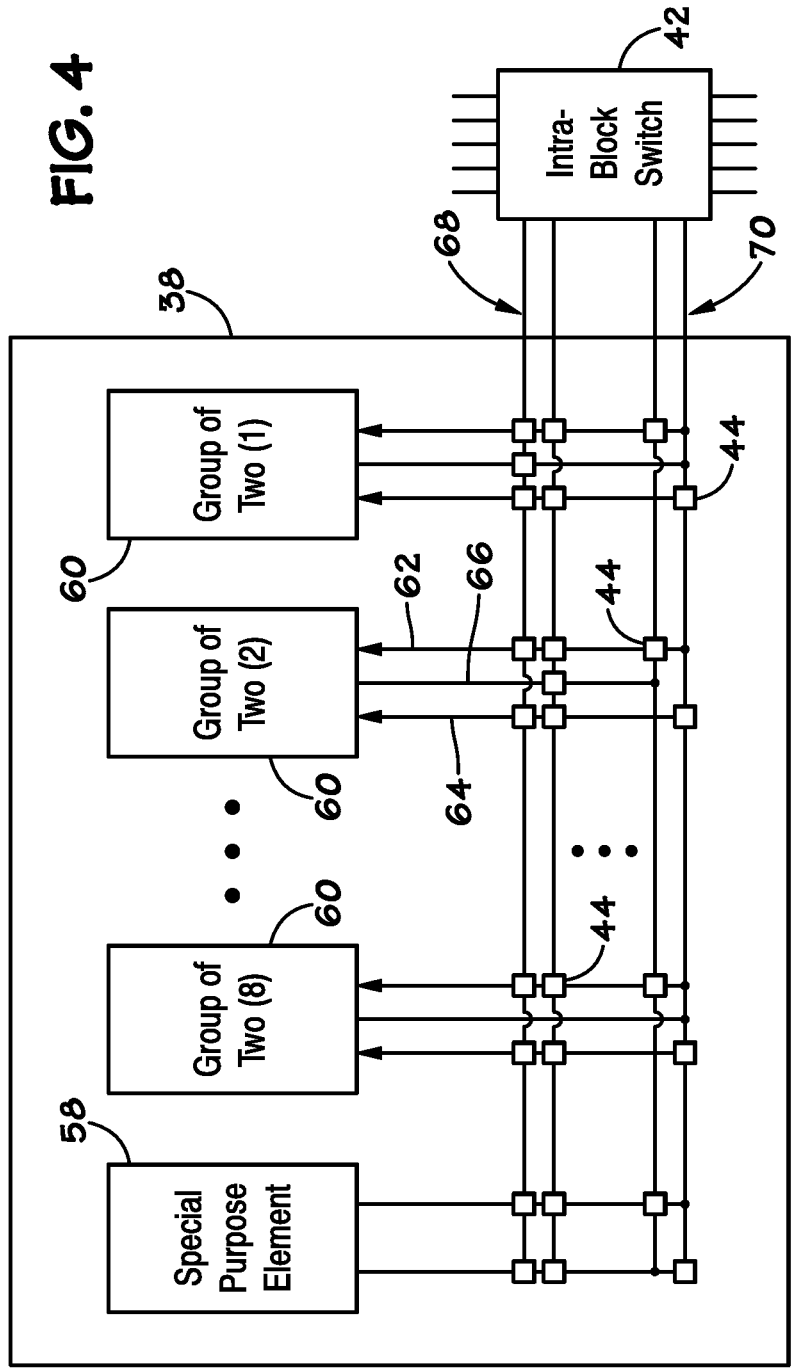
FIG. 4 illustrates an example of a row of the block of FIG. 3, according to various embodiments of the invention.

FIG. 4 illustrates an example of a row 38. A GOT 60 can be selectively coupled to other GOTs 60 and any other elements (e.g., a special purpose element 58) within the row 38 by configurable intra-row switching elements 44. A GOT 60 can also be coupled to other GOTs 60 in other rows 38 with the intra-block switching element 42, or other GOTs 60 in other blocks 32 with an inter-block switching element 40. In an example, a GOT 60 has a first and second input 62, 64, and an output 66. The first input 62 is coupled to a first SME 34 of the GOT 60 and the second input 64 is coupled to a second SME 36 of the GOT 60, as will be further illustrated with reference to FIG. 5.

In an example, the row 38 includes a first and second plurality of row interconnection conductors 68, 70. In an example, an input 62, 64 of a GOT 60 can be coupled to one or more row interconnection conductors 68, 70, and an output 66 can be coupled to one or more row interconnection conductor 68, 70. In an example, a first plurality of the row interconnection conductors 68 can be coupled to each SME 34, 36 of each GOT 60 within the row 38. A second plurality of the row interconnection conductors 70 can be coupled to only one SME 34, 36 of each GOT 60 within the row 38, but cannot be coupled to the other SME 34, 36 of the GOT 60. In an example, a first half of the second plurality of row interconnection conductors 70 can couple to first half of the SMEs 34, 36 within a row 38 (one SME 34 from each GOT 60) and a second half of the second plurality of row interconnection conductors 70 can couple to a second half of the SMEs 34, 36 within a row 38 (the other SME 34, 36 from each GOT 60), as will be better illustrated with respect to FIG. 5. The limited connectivity between the second plurality of row interconnection conductors 70 and the SMEs 34, 36 is referred to herein as "parity". In an example, the row 38 can also include a special purpose element 58 such as a counter, a configurable Boolean logic element, look-up table, RAM, a field configurable gate array (FPGA), an application specific integrated circuit (ASIC), a configurable processor (e.g., a microprocessor), or other element for performing a special purpose function.

In an example, the special purpose element 58 comprises a counter (also referred to herein as counter 58). In an example, the counter 58 comprises a 12-bit configurable down counter. The 12-bit configurable counter 58 has a counting input, a reset input, and zero-count output. The counting input, when asserted, decrements the value of the counter 58 by one. The reset input, when asserted, causes the counter 58 to load an initial value from an associated register. For the 12-bit counter

58, up to a 12-bit number can be loaded in as the initial value. When the value of the counter 58 is decremented to zero (0), the zero-count output is asserted. The counter 58 also has at least two modes, pulse and hold. When the counter 58 is set to pulse mode, the zero-count output is asserted when the counter 58 reaches zero and the clock cycles. The zero-count output is asserted during the next clock cycle of the counter 58. Resulting in the counter 58 being offset in time from the clock cycle. At the next clock cycle, the zero-count output is no longer asserted. When the counter 58 is set to hold mode the zero-count output is asserted during the clock cycle when the counter 58 decrements to zero, and stays asserted until the counter 58 is reset by the reset input being asserted.

In another example, the special purpose element 58 comprises Boolean logic. For example, the Boolean logic may be used to perform logical functions, such as AND, OR, NAND, NOR, Sum of Products (SoP), Negated-Output Sum of Products (NSoP), Negated-Output Product of Sume (NPoS), and Product of Sums (PoS) functions. This Boolean logic can be used to extract data from terminal state SMEs (corresponding to terminal nodes of a FSM, as discussed later herein) in FSM lattice 30. The data extracted can be used to provide state data to other FSM lattices 30 and/or to provide configuring data used to reconfigure FSM lattice 30, or to reconfigure another FSM lattice 30.

Figure 5:
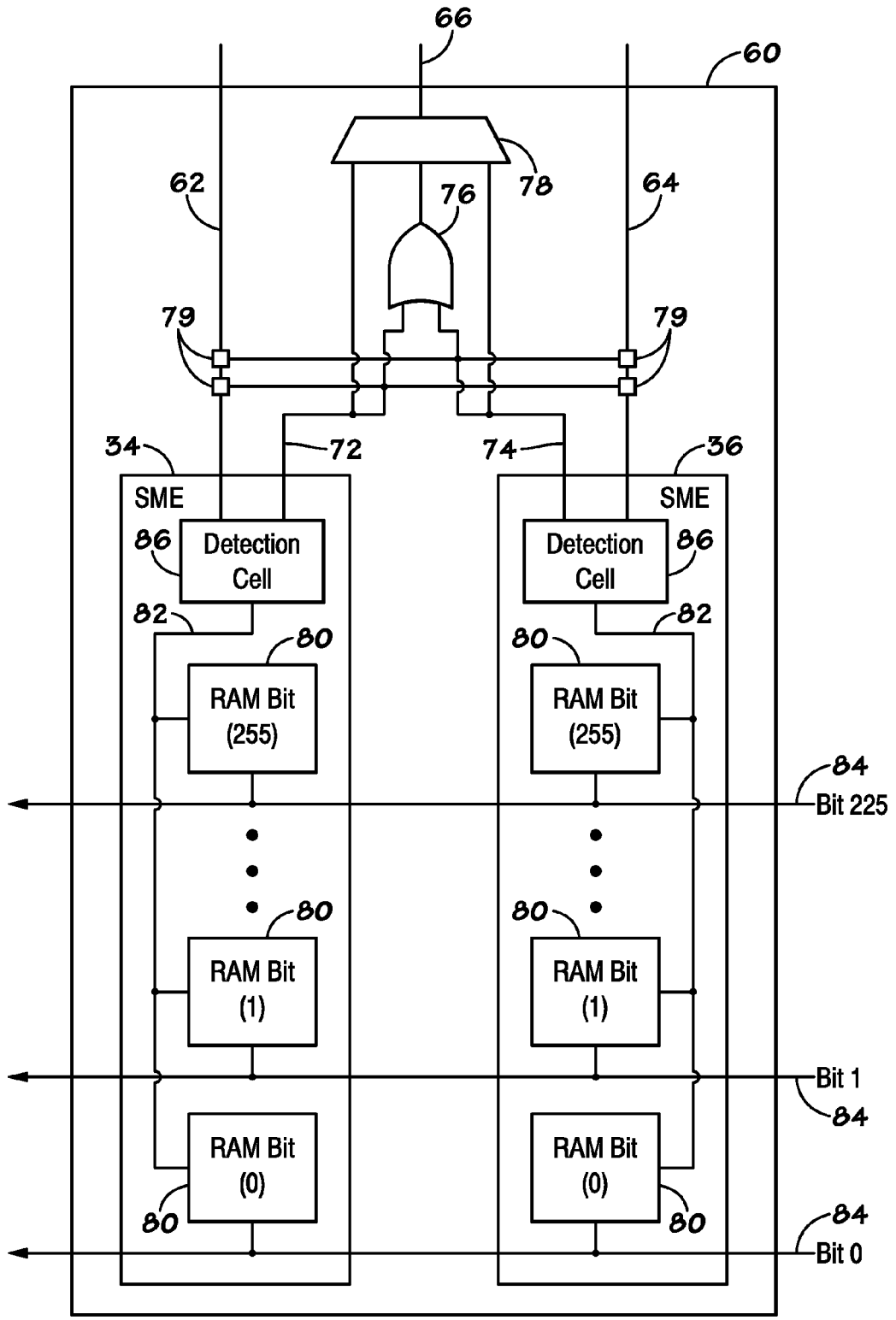
FIG. 5 illustrates an example of a Group of Two of the row of FIG. 4, according to various embodiments of the invention.

FIG. 5 illustrates an example of a GOT 60. The GOT 60 includes a first SME 34 and a second SME 36 having inputs 62, 64 and having their outputs 72, 74 coupled to an OR gate 76 and a 3-to-1 multiplexer 78. The 3-to-1 multiplexer 78 can be set to couple the output 66 of the GOT 60 to either the first SME 34, the second SME 36, or the OR gate 76. The OR gate 76 can be used to couple together both outputs 72, 74 to form the common output 66 of the GOT 60. In an example, the first and second SME 34, 36 exhibit parity, as discussed above, where the input 62 of the first SME 34 can be coupled to some of the row interconnect conductors 68 and the input 64 of the second SME 36 can be coupled to other row interconnect conductors 70 the common output 66 may be produced which may overcome parity problems. In an example, the two SMEs 34, 36 within a GOT 60 can be cascaded and/or looped back to themselves by setting either or both of switching elements 79. The SMEs 34, 36 can be cascaded by coupling the output 72, 74 of the SMEs 34, 36 to the input 62, 64 of the other SME 34, 36. The SMEs 34, 36 can be looped back to themselves by coupling the output 72, 74 to their own input 62, 64. Accordingly, the output 72 of the first SME 34 can be coupled to neither, one, or both of the input 62 of the first SME 34 and the input 64 of the second SME 36.

In an example, a state machine element 34, 36 comprises a plurality of memory cells 80, such as those often used in dynamic random access memory (DRAM), coupled in parallel to a detect line 82. One such memory cell 80 comprises a memory cell that can be set to a data state, such as one that corresponds to either a high or a low value (e.g., a 1 or 0). The output of the memory cell 80 is coupled to the detect line 82 and the input to the memory cell 80 receives signals based on data on the data stream line 84. In an example, an input at the input block 52 is decoded to select one or more of the memory cells 80. The selected memory cell 80 provides its stored data state as an output onto the detect line 82. For example, the data received at the input block 52 can be provided to a decoder (not shown) and the decoder can select one or more of the data stream lines 84. In an example, the decoder can convert an 8-bit ACSII character to the corresponding 1 of 256 data stream lines 84.

A memory cell 80, therefore, outputs a high signal to the detect line 82 when the memory cell 80 is set to a high value and the data on the data stream line 84 selects the memory cell 80. When the data on the data stream line 84 selects the memory cell 80 and the memory cell 80 is set to a low value, the memory cell 80 outputs a low signal to the detect line 82. The outputs from the memory cells 80 on the detect line 82 are sensed by a detection cell 86.

In an example, the signal on an input line 62, 64 sets the respective detection cell 86 to either an active or inactive state. When set to the inactive state, the detection cell 86 outputs a low signal on the respective output 72, 74 regardless of the signal on the respective detect line 82. When set to an active state, the detection cell 86 outputs a high signal on the respective output line 72, 74 when a high signal is detected from one of the memory cells 82 of the respective SME 34, 36. When in the active state, the detection cell 86 outputs a low signal on the respective output line 72, 74 when the signals from all of the memory cells 82 of the respective SME 34, 36 are low.

In an example, an SME 34, 36 includes 256 memory cells 80 and each memory cell 80 is coupled to a different data stream line 84. Thus, an SME 34, 36 can be programmed to output a high signal when a selected one or more of the data stream lines 84 have a high signal thereon. For example, the SME 34 can have a first memory cell 80 (e.g., bit 0) set high and all other memory cells 80 (e.g., bits 1-255) set low. When the respective detection cell 86 is in the active state, the SME 34 outputs a high signal on the output 72 when the data stream line 84 corresponding to bit 0 has a high signal thereon. In other examples, the SME 34 can be set to output a high signal when one of multiple data stream lines 84 have a high signal thereon by setting the appropriate memory cells 80 to a high value.

In an example, a memory cell 80 can be set to a high or low value by reading bits from an associated register. Accordingly, the SMEs 34 can be configured by storing an image created by the compiler 20 into the registers and loading the bits in the registers into associated memory cells 80. In an example, the image created by the compiler 20 includes a binary image of high and low (e.g., 1 and 0) bits. The image can configure the FSM lattice 30 to implement a FSM by cascading the SMEs 34, 36. For example, a first SME 34 can be set to an active state by setting the detection cell 86 to the active state. The first SME 34 can be set to output a high signal when the data stream line 84 corresponding to bit 0 has a high signal thereon. The second SME 36 can be initially set to an inactive state, but can be set to, when active, output a high signal when the data stream line 84 corresponding to bit 1 has a high signal thereon. The first SME 34 and the second SME 36 can be cascaded by setting the output 72 of the first SME 34 to couple to the input 64 of the second SME 36. Thus, when a high signal is sensed on the data stream line 84 corresponding to bit 0, the first SME 34 outputs a high signal on the output 72 and sets the detection cell 86 of the second SME 36 to an active state. When a high signal is sensed on the data stream line 84 corresponding to bit 1, the second SME 36 outputs a high signal on the output 74 to activate another SME 36 or for output from the FSM lattice 30.

In an example, a single FSM lattice 30 is implemented on a single physical device, however, in other examples two or more FSM lattices 30 can be implemented on a single physical device (e.g., physical chip). In an example, each FSM lattice 30 can include a distinct data input block 52, a distinct output block 54, a distinct programming interface 56, and a distinct set of configurable elements. Moreover, each set of configurable elements can react (e.g., output a high or low signal) to data at their corresponding data input block 52. For example, a first set of configurable elements corresponding to a first FSM lattice 30 can react to the data at a first data input block 52 corresponding to the first FSM lattice 30. A second set of configurable elements corresponding to a second FSM lattice 30 can react to a second data input block 52 corresponding to the second FSM lattice 30. Accordingly, each FSM lattice 30 includes a set of configurable elements, wherein different sets of configurable elements can react to different input data. Similarly, each FSM lattice 30, and each corresponding set of configurable elements can provide a distinct output. In some examples, an output block 54 from a first FSM lattice 30 can be coupled to an input block 52 of a second FSM lattice 30, such that input data for the second FSM lattice 30 can include the output data from the first FSM lattice 30 in a hierarchical arrangement of a series of FSM lattices 30.

In an example, an image for loading onto the FSM lattice 30 comprises a plurality of bits of data for configuring the configurable elements, the configurable switching elements, and the special purpose elements within the FSM lattice 30. In an example, the image can be loaded onto the FSM lattice 30 to configure the FSM lattice 30 to provide a desired output based on certain inputs. The output block 54 can provide outputs from the FSM lattice 30 based on the reaction of the configurable elements to data at the data input block 52. An output from the output block 54 can include a single bit indicating a match of a given pattern, a word comprising a plurality of bits indicating matches and non-matches to a plurality of patterns, and a state vector corresponding to the state of all or certain configurable elements at a given moment. As described, a number of FSM lattices 30 may be included in a state machine engine, such as state machine engine 14, to perform data analysis, such as pattern-recognition (e.g., speech recognition, image recognition, etc.) signal processing, imaging, computer vision, cryptography, and others.

Figure 6:
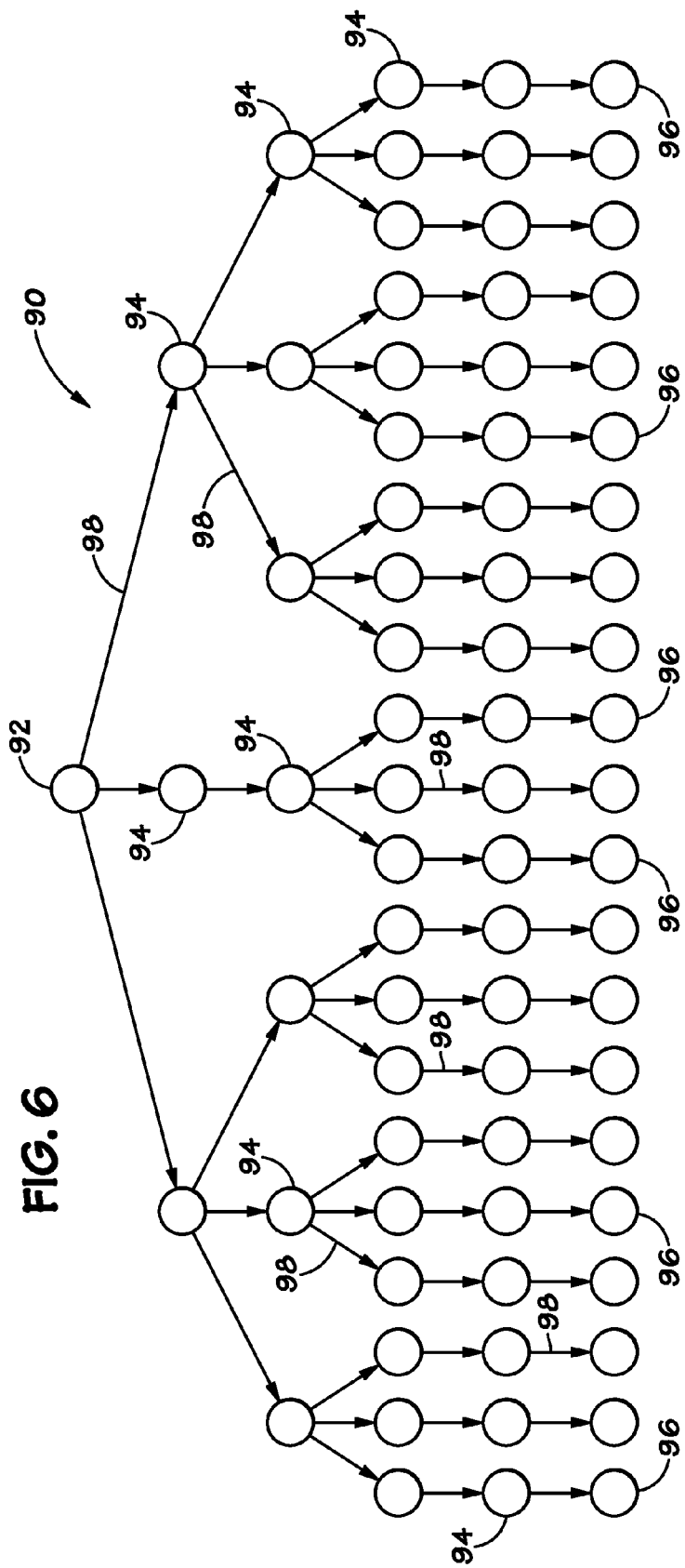
FIG. 6 illustrates an example of a finite state machine graph, according to various embodiments of the invention.

FIG. 6 illustrates an example model of a finite state machine (FSM) that can be implemented by the FSM lattice 30. The FSM lattice 30 can be configured (e.g., programmed) as a physical implementation of a FSM. A FSM can be represented as a diagram 90, (e.g., directed graph, undirected graph, pseudograph), which contains one or more root nodes 92. In addition to the root nodes 92, the FSM can be made up of several standard nodes 94 and terminal nodes 96 that are connected to the root nodes 92 and other standard nodes 94 through one or more edges 98. A node 92, 94, 96 corresponds to a state in the FSM. The edges 98 correspond to the transitions between the states.

Each of the nodes 92, 94, 96 can be in either an active or an inactive state. When in the inactive state, a node 92, 94, 96 does not react (e.g., respond) to input data. When in an active state, a node 92, 94, 96 can react to input data. An upstream node 92, 94 can react to the input data by activating a node 94, 96 that is downstream from the node when the input data matches criteria specified by an edge 98 between the upstream node 92, 94 and the downstream node 94, 96. For example, a first node 94 that specifies the character 'b' will activate a second node 94 connected to the first node 94 by an edge 98 when the first node 94 is active and the character 'b' is received as input data. As used herein, "upstream" refers to a relationship between one or more nodes, where a first node that is upstream of one or more other nodes (or upstream of itself in the case of a loop or feedback configuration) refers to the situation in which the first node can activate the one or more other nodes (or can activate itself in the case of a loop). Similarly, "downstream" refers to a relationship where a first node that is downstream of one or more other nodes (or downstream of itself in the case of a loop) can be activated by the one or more other nodes (or can be activated by itself in the case of a loop). Accordingly, the terms "upstream" and "downstream" are used herein to refer to relationships between one or more nodes, but these terms do not preclude the use of loops or other non-linear paths among the nodes.

In the diagram 90, the root node 92 can be initially activated and can activate downstream nodes 94 when the input data matches an edge 98 from the root node 92. Nodes 94 can activate nodes 96 when the input data matches an edge 98 from the node 94. Nodes 94, 96 throughout the diagram 90 can be activated in this manner as the input data is received. A terminal node 96 corresponds to a match of a sequence of interest in the input data. Accordingly, activation of a terminal node 96 indicates that a sequence of interest has been received as the input data. In the context of the FSM lattice 30 implementing a pattern recognition function, arriving at a terminal node 96 can indicate that a specific pattern of interest has been detected in the input data.

In an example, each root node 92, standard node 94, and terminal node 96 can correspond to a configurable element in the FSM lattice 30. Each edge 98 can correspond to connections between the configurable elements. Thus, a standard node 94 that transitions to (e.g., has an edge 98 connecting to) another standard node 94 or a terminal node 96 corresponds to a configurable element that transitions to (e.g., provides an output to) another configurable element. In some examples, the root node 92 does not have a corresponding configurable element.

As will be appreciated, although the node 92 is described as a root node and nodes 96 are described as terminal nodes, there may not necessarily be a particular "start" or root node and there may not necessarily be a particular "end" or output node. In other words, any node may be a starting point and any node may provide output.

When the FSM lattice 30 is programmed, each of the configurable elements can also be in either an active or inactive state. A given configurable element, when inactive, does not react to the input data at a corresponding data input block 52. An active configurable element can react to the input data at the data input block 52, and can activate a downstream configurable element when the input data matches the setting of the configurable element. When a configurable element corresponds to a terminal node 96, the configurable element can be coupled to the output block 54 to provide an indication of a match to an external device.

An image loaded onto the FSM lattice 30 via the programming interface 56 can configure the configurable elements and special purpose elements, as well as the connections between the configurable elements and special purpose elements, such that a desired FSM is implemented through the sequential activation of nodes based on reactions to the data at the data input block 52. In an example, a configurable element remains active for a single data cycle (e.g., a single character, a set of characters, a single clock cycle) and then becomes inactive unless re-activated by an upstream configurable element.

A terminal node 96 can be considered to store a compressed history of past events. For example, the one or more patterns of input data required to reach a terminal node 96 can be represented by the activation of that terminal node 96. In an example, the output provided by a terminal node 96 is binary, that is, the output indicates whether the pattern of interest has been matched or not. The ratio of terminal nodes 96 to standard nodes 94 in a diagram 90 may be quite small. In other words, although there may be a high complexity in the FSM, the output of the FSM may be small by comparison.

In an example, the output of the FSM lattice 30 can comprise a state vector. The state vector comprises the state (e.g., activated or not activated) of configurable elements of the FSM lattice 30. In another example, the state vector can include the state of all or a subset of the configurable elements whether or not the configurable elements corresponds to a terminal node 96. In an example, the state vector includes the states for the configurable elements corresponding to terminal nodes 96. Thus, the output can include a collection of the indications provided by all terminal nodes 96 of a diagram 90. The state vector can be represented as a word, where the binary indication provided by each terminal node 96 comprises one bit of the word. This encoding of the terminal nodes 96 can provide an effective indication of the detection state (e.g., whether and what sequences of interest have been detected) for the FSM lattice 30.

As mentioned above, the FSM lattice 30 can be programmed to implement a pattern recognition function. For example, the FSM lattice 30 can be configured to recognize one or more data sequences (e.g., signatures, patterns) in the input data. When a data sequence of interest is recognized by the FSM lattice 30, an indication of that recognition can be provided at the output block 54. In an example, the pattern recognition can recognize a string of symbols (e.g., ASCII characters) to, for example, identify malware or other data in network data.

Figure 7:
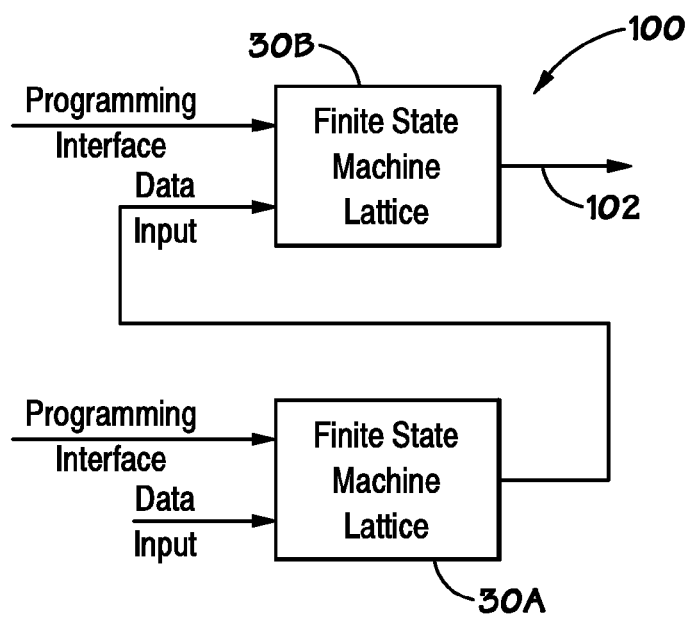
FIG. 7 illustrates an example of two-level hierarchy implemented with FSM lattices, according to various embodiments of the invention.

FIG. 7 illustrates an example of hierarchical structure 100, wherein two levels of FSM lattices 30 are coupled in series and used to analyze data. Specifically, in the illustrated embodiment, the hierarchical structure 100 includes a first FSM lattice 30A and a second FSM lattice 30B arranged in series. Each FSM lattice 30 includes a respective data input block 52 to receive data input, a programming interface block 56 to receive configuring signals and an output block 54.

The first FSM lattice 30A is configured to receive input data, for example, raw data at a data input block. The first FSM lattice 30A reacts to the input data as described above and provides an output at an output block. The output from the first FSM lattice 30A is sent to a data input block of the second FSM lattice 30B. The second FSM lattice 30B can then react based on the output provided by the first FSM lattice 30A and provide a corresponding output signal 102 of the hierarchical structure 100. This hierarchical coupling of two FSM lattices 30A and 30B in series provides a means to provide data regarding past events in a compressed word from a first FSM lattice 30A to a second FSM lattice 30B. The data provided can effectively be a summary of complex events (e.g., sequences of interest) that were recorded by the first FSM lattice 30A.

The two-level hierarchy 100 of FSM lattices 30A, 30B shown in FIG. 7 allows two independent programs to operate based on the same data stream. The two-stage hierarchy can be similar to visual recognition in a biological brain which is modeled as different regions. Under this model, the regions are effectively different pattern recognition engines, each performing a similar computational function (pattern matching) but using different programs (signatures). By connecting multiple FSM lattices 30A, 30B together, increased knowledge about the data stream input may be obtained.

The first level of the hierarchy (implemented by the first FSM lattice 30A) can, for example, perform processing directly on a raw data stream. That is, a raw data stream can be received at an input block 52 of the first FSM lattice 30A and the configurable elements of the first FSM lattice 30A can react to the raw data stream. The second level (implemented by the second FSM lattice 30B) of the hierarchy can process the output from the first level. That is, the second FSM lattice 30B receives the output from an output block 54 of the first FSM lattice 30A at an input block 52 of the second FSM lattice 30B and the configurable elements of the second FSM lattice 30B can react to the output of the first FSM lattice 30A. Accordingly, in this example, the second FSM lattice 30B does not receive the raw data stream as an input, but rather receives the indications of patterns of interest that are matched by the raw data stream as determined by the first FSM lattice 30A. The second FSM lattice 30B can implement a FSM that recognizes patterns in the output data stream from the first FSM lattice 30A. It should be appreciated that the second FSM lattice 30B may receive inputs from multiple other FSM lattices in addition to receiving output from the FSM lattice 30A. Likewise, the second FSM lattice 30B may receive inputs from other devices. The second FSM lattice 30B may combine these multiple inputs to produce outputs.

Figure 8:
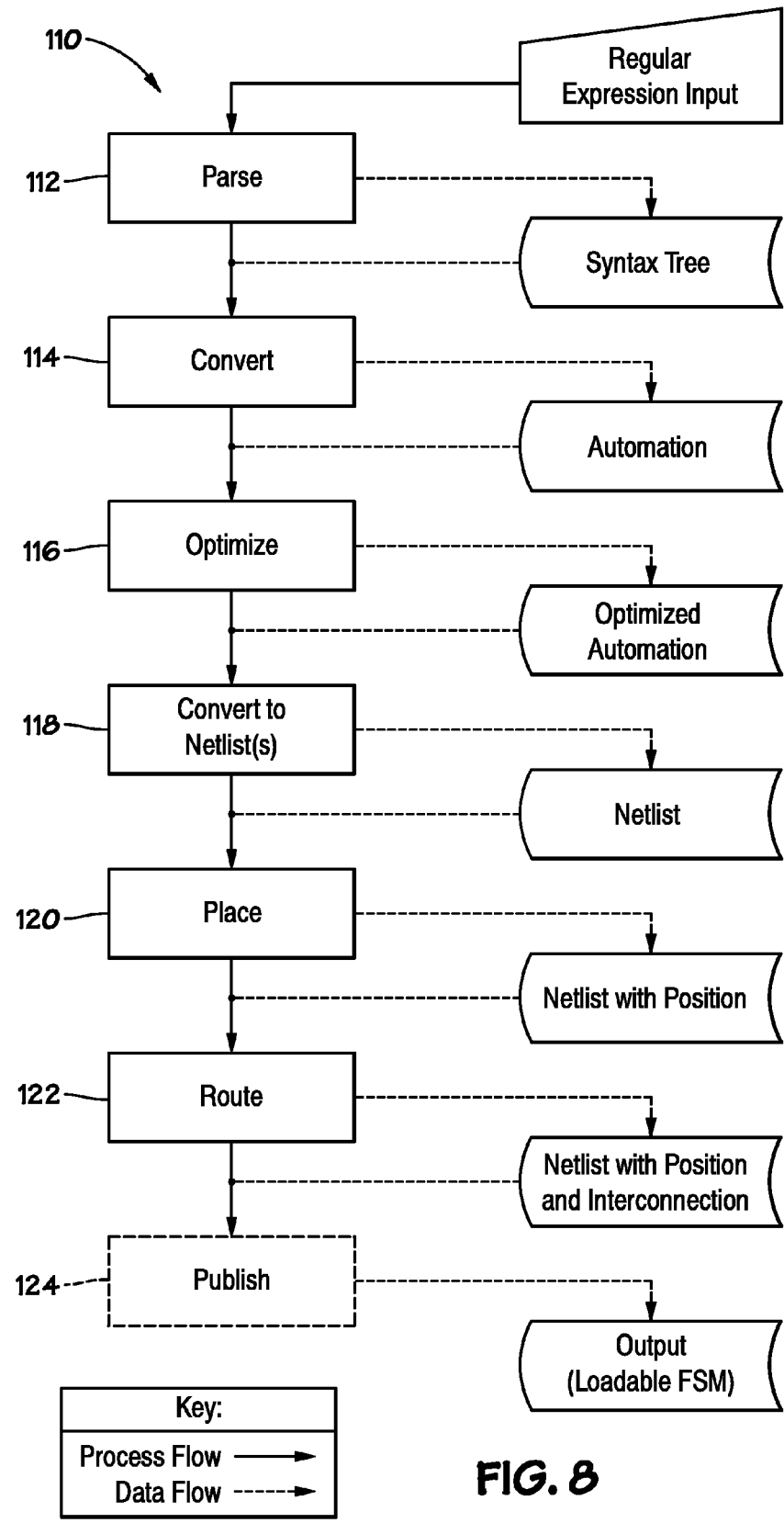
FIG. 8 illustrates an example of a method for a compiler to convert source code into a binary file for programming of the FSM lattice of FIG. 2, according to various embodiments of the invention.

FIG. 8 illustrates an example of a method 110 for a compiler to convert source code into an image used to configure a FSM lattice, such as lattice 30, to implement a FSM. Method 110 includes parsing the source code into a syntax tree (block 112), converting the syntax tree into an automaton (block 114), optimizing the automaton (block 116), converting the automaton into a netlist (block 118), placing the netlist on hardware (block 120), routing the netlist (block 122), and publishing the resulting image (block 124).

In an example, the compiler 20 includes an application programming interface (API) that allows software developers to create images for implementing FSMs on the FSM lattice 30. The compiler 20 provides methods to convert an input set of regular expressions in the source code into an image that is configured to configure the FSM lattice 30. The compiler 20 can be implemented by instructions for a computer having a von Neumann architecture. These instructions can cause a processor 12 on the computer to implement the functions of the compiler 20. For example, the instructions, when executed by the processor 12, can cause the processor 12 to perform actions as described in blocks 112, 114, 116, 118, 120, 122, and 124 on source code that is accessible to the processor 12.

In an example, the source code describes search strings for identifying patterns of symbols within a group of symbols. To describe the search strings, the source code can include a plurality of regular expressions (regexes). A regex can be a string for describing a symbol search pattern. Regexes are widely used in various computer domains, such as programming languages, text editors, network security, and others. In an example, the regular expressions supported by the compiler include criteria for the analysis of unstructured data. Unstructured data can include data that is free form and has no indexing applied to words within the data. Words can include any combination of bytes, printable and non-printable, within the data. In an example, the compiler can support multiple different source code languages for implementing regexes including Perl, (e.g., Perl compatible regular expressions (PCRE)), PHP, Java, and .NET languages.

At block 112 the compiler 20 can parse the source code to form an arrangement of relationally connected operators, where different types of operators correspond to different functions implemented by the source code (e.g., different functions implemented by regexes in the source code). Parsing source code can create a generic representation of the source code. In an example, the generic representation comprises an encoded representation of the regexs in the source code in the form of a tree graph known as a syntax tree. The examples described herein refer to the arrangement as a syntax tree (also known as an "abstract syntax tree") in other examples, however, a concrete syntax tree or other arrangement can be used.

Since, as mentioned above, the compiler 20 can support multiple languages of source code, parsing converts the source code, regardless of the language, into a non-language specific representation, e.g., a syntax tree. Thus, further processing (blocks 114, 116, 118, 120) by the compiler 20 can work from a common input structure regardless of the language of the source code.

As noted above, the syntax tree includes a plurality of operators that are relationally connected. A syntax tree can include multiple different types of operators. That is, different operators can correspond to different functions implemented by the regexes in the source code.

At block 114, the syntax tree is converted into an automaton. An automaton comprises a software model of a FSM and can accordingly be classified as deterministic or non-deterministic. A deterministic automaton has a single path of execution at a given time, while a non-deterministic automaton has multiple concurrent paths of execution. The automaton comprises a plurality of states. In order to convert the syntax tree into an automaton, the operators and relationships between the operators in the syntax tree are converted into states with transitions between the states. In an example, the automaton can be converted based partly on the hardware of the FSM lattice 30.

In an example, input symbols for the automaton include the symbols of the alphabet, the numerals 0-9, and other printable characters. In an example, the input symbols are represented by the byte values 0 through 255 inclusive. In an example, an automaton can be represented as a directed graph where the nodes of the graph correspond to the set of states. In an example, a transition from state p to state q on an input symbol α, i.e. δ(p,α), is shown by a directed connection from node p to node q. In an example, a reversal of an automaton produces a new automaton where each transition p→q on some symbol α is reversed q→p on the same symbol. In a reversal, start state becomes a final state and the final states become start states. In an example, the language recognized (e.g., matched) by an automaton is the set of all possible character strings which when input sequentially into the automaton will reach a final state. Each string in the language recognized by the automaton traces a path from the start state to one or more final states.

At block 116, after the automaton is constructed, the automaton is optimized to reduce its complexity and size, among other things. The automaton can be optimized by combining redundant states.

At block 118, the optimized automaton is converted into a netlist. Converting the automaton into a netlist maps each state of the automaton to a hardware element (e.g., SMEs 34, 36, other elements) on the FSM lattice 30, and determines the connections between the hardware elements.

At block 120, the netlist is placed to select a specific hardware element of the target device (e.g., SMEs 34, 36, special purpose elements 58) corresponding to each node of the netlist. In an example, placing selects each specific hardware element based on general input and output constraints for of the FSM lattice 30.

At block 122, the placed netlist is routed to determine the settings for the configurable switching elements (e.g., inter-block switching elements 40, intra-block switching elements 42, and intra-row switching elements 44) in order to couple the selected hardware elements together to achieve the connections describe by the netlist. In an example, the settings for the configurable switching elements are determined by determining specific conductors of the FSM lattice 30 that will be used to connect the selected hardware elements, and the settings for the configurable switching elements. Routing can take into account more specific limitations of the connections between the hardware elements that placement at block 120. Accordingly, routing may adjust the location of some of the hardware elements as determined by the global placement in order to make appropriate connections given the actual limitations of the conductors on the FSM lattice 30.

Once the netlist is placed and routed, the placed and routed netlist can be converted into a plurality of bits for configuring a FSM lattice 30. The plurality of bits are referred to herein as an image (e.g., binary image).

At block 124, an image is published by the compiler 20. The image comprises a plurality of bits for configuring specific hardware elements of the FSM lattice 30. The bits can be loaded onto the FSM lattice 30 to configure the state of SMEs 34, 36, the special purpose elements 58, and the configurable switching elements such that the programmed FSM lattice 30 implements a FSM having the functionality described by the source code. Placement (block 120) and routing (block 122) can map specific hardware elements at specific locations in the FSM lattice 30 to specific states in the automaton. Accordingly, the bits in the image can configure the specific hardware elements to implement the desired function(s). In an example, the image can be published by saving the machine code to a computer readable medium. In another example, the image can be published by displaying the image on a display device. In still another example, the image can be published by sending the image to another device, such as a configuring device for loading the image onto the FSM lattice 30. In yet another example, the image can be published by loading the image onto a FSM lattice (e.g., the FSM lattice 30).

In an example, an image can be loaded onto the FSM lattice 30 by either directly loading the bit values from the image to the SMEs 34, 36 and other hardware elements or by loading the image into one or more registers and then writing the bit values from the registers to the SMEs 34, 36 and other hardware elements. In an example, the hardware elements (e.g., SMEs 34, 36, special purpose elements 58, configurable switching elements 40, 42, 44) of the FSM lattice 30 are memory mapped such that a configuring device and/or computer can load the image onto the FSM lattice 30 by writing the image to one or more memory addresses.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 9:
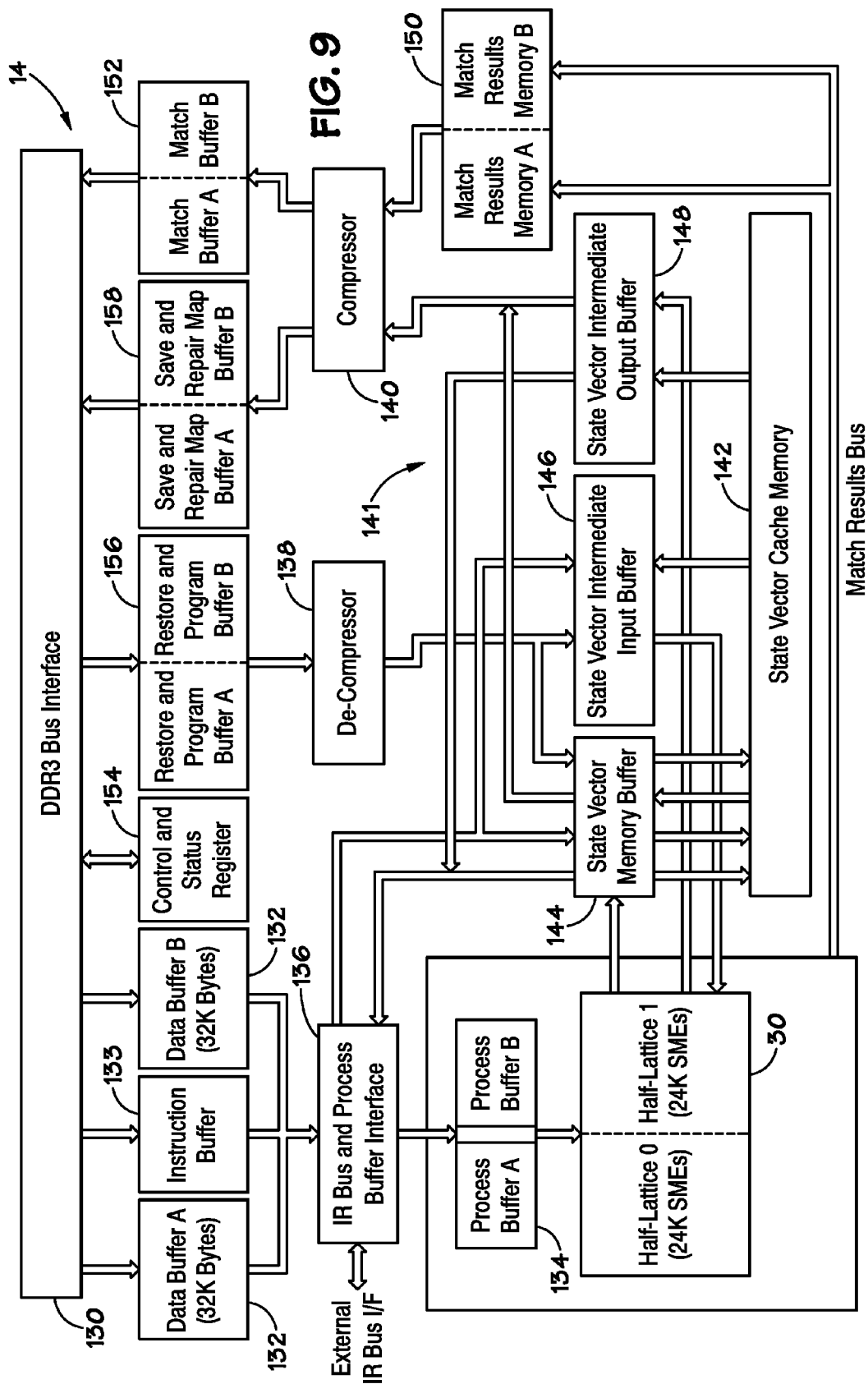
FIG. 9 illustrates a state machine engine, according to various embodiments of the invention.

Referring now to FIG. 9, an embodiment of the state machine engine 14 (e.g., a single device on a single chip) is illustrated. As previously described, the state machine engine 14 is configured to receive data from a source, such as the memory 16 over a data bus. In the illustrated embodiment, data may be sent to the state machine engine 14 through a bus interface, such as a double data rate three (DDR3) bus interface 130. The DDR3 bus interface 130 may be capable of exchanging (e.g., providing and receiving) data at a rate greater than or equal to 1 GByte/sec. Such a data exchange rate may be greater than a rate that data is analyzed by the state machine engine 14. As will be appreciated, depending on the source of the data to be analyzed, the bus interface 130 may be any suitable bus interface for exchanging data to and from a data source to the state machine engine 14, such as a NAND Flash interface, peripheral component interconnect (PCI) interface, gigabit media independent interface (GMMI), etc. As previously described, the state machine engine 14 includes one or more FSM lattices 30 configured to analyze data. Each FSM lattice 30 may be divided into two half-lattices. In the illustrated embodiment, each half lattice may include 24K SMEs (e.g., SMEs 34, 36), such that the lattice 30 includes 48K SMEs. The lattice 30 may comprise any desirable number of SMEs, arranged as previously described with regard to FIGS. 2-5. Further, while only one FSM lattice 30 is illustrated, the state machine engine 14 may include multiple FSM lattices 30, as previously described.

Data to be analyzed may be received at the bus interface 130 and provided to the FSM lattice 30 through a number of buffers and buffer interfaces. In the illustrated embodiment, the data path includes data buffers 132, an instruction buffer 133, process buffers 134, and an inter-rank (IR) bus and process buffer interface 136. The data buffers 132 are configured to receive and temporarily store data to be analyzed. In one embodiment, there are two data buffers 132 (data buffer A and data buffer B). Data may be stored in one of the two data buffers 132, while data is being emptied from the other data buffer 132, for analysis by the FSM lattice 30. The bus interface 130 may be configured to provide data to be analyzed to the data buffers 132 until the data buffers 132 are full. After the data buffers 132 are full, the bus interface 130 may be configured to be free to be used for other purposes (e.g., to provide other data from a data stream until the data buffers 132 are available to receive additional data to be analyzed). In the illustrated embodiment, the data buffers 132 may be 32 KBytes each. The instruction buffer 133 is configured to receive instructions from the processor 12 via the bus interface 130, such as instructions that correspond to the data to be analyzed and instructions that correspond to configuring the state machine engine 14. The IR bus and process buffer interface 136 may facilitate providing data to the process buffer 134. The IR bus and process buffer interface 136 can be used to ensure that data is processed by the FSM lattice 30 in order. The IR bus and process buffer interface 136 may coordinate the exchange of data, timing data, packing instructions, etc. such that data is received and analyzed correctly. Generally, the IR bus and process buffer interface 136 allows the use of multiple devices in a rank of devices. The multiple devices in the rank of devices share data such that all of the multiple devices receive all of the shared data in the correct order. For example, multiple physical devices (e.g., state machine engines 14, chips, separate devices) may be arranged in a rank and may provide data to each other via the IR bus and process buffer interface 136. For purposes of this application the term "rank" refers to a set of state machine engines 14 connected to the same chip select. In the illustrated embodiment, the IR bus and process buffer interface 136 may include an 8 bit data bus.

In the illustrated embodiment, the state machine engine 14 also includes a de-compressor 138 and a compressor 140 to aid in providing data to and from the state machine engine 14. As may be appreciated, the compressor 140 and de-compressor 138 may use the same compression algorithms to simplify software and/or hardware designs; however, the compressor 140 and the de-compressor 138 may also use different algorithms. By compressing the data, the bus interface 130 (e.g., DDR3 bus interface) utilization time may be minimized. In the present embodiment, the compressor 140 may be used to compress state vector data, configuration data (e.g., programming data), and match results data obtained after analysis by the FSM lattice 30. In one embodiment, the compressor 140 and de-compressor 138 may be disabled (e.g., turned off) such that data flowing to and/or from the compressor 140 and de-compressor 138 is not modified (e.g., neither compressed nor de-compressed).

The compressor 140 and de-compressor 138 can also be configured to handle multiple sets of data and each set of data may be of varying lengths. By "padding" compressed data and including an indicator as to when each compressed region ends, the compressor 140 may improve the overall processing speed through the state machine engine 14.

The state machine engine 14 includes a state vector system 141 having a state vector cache memory 142, a state vector memory buffer 144, a state vector intermediate input buffer 146, and a state vector intermediate output buffer 148. The state vector system 141 may be used to store multiple state vectors of the FSM lattice 30, to move state vectors onto or off of the state machine engine 14, and to provide a state vector to the FSM lattice 30 to restore the FSM lattice 30 to a state corresponding to the provided state vector. For example, each state vector may be temporarily stored in the state vector cache memory 142. That is, the state of each SME 34, 36 may be stored, such that the state may be restored and used in further analysis at a later time, while freeing the SMEs 34, 36 for analysis of a new data set (e.g., search term). Like a typical cache, the state vector cache memory 142 allows storage of state vectors for quick retrieval and use, here by the FSM lattice 30, for instance. In the illustrated embodiment, the state vector cache memory 142 may store up to 512 state vectors. Each state vector comprises the state (e.g., activated or not activated) of the SMEs 34, 36 of the FSM lattice 30 and the dynamic (e.g., current) count of the counters 58.

As will be appreciated, the state vector data may be exchanged between different state machine engines 14 (e.g., chips) in a rank. The state vector data may be exchanged between the different state machine engines 14 for various purposes such as: to synchronize the state of the SMEs 34, 36 of the FSM lattices 30 and the dynamic count of the counters 58, to perform the same functions across multiple state machine engines 14, to reproduce results across multiple state machine engines 14, to cascade results across multiple state machine engines 14, to store a history of states of the SMEs 34, 36 and the dynamic count of the counters 58 used to analyze data that is cascaded through multiple state machine engines 14, and so forth. Furthermore, it should be noted that within a state machine engine 14, the state vector data may be used to quickly restore the state vector. For example, the state vector data may be used to restore the state of the SMEs 34, 36 and the dynamic count of the counters 58 to an initialized state (e.g., to search for a new search term), to restore the state of the SMEs 34, 36 and the dynamic count of the counters 58 to prior state (e.g., to search for a previously searched search term), and to change the state of the SMEs 34, 36 and the dynamic count of the counters 58 to be configured for a cascading configuration (e.g., to search for a search term in a cascading search). In certain embodiments, the state vector data may be provided to the bus interface 130 so that the state vector data may be provided to the processor 12 (e.g., for analysis of the state vector data, reconfiguring the state vector data to apply modifications, reconfiguring the state vector data to improve efficiency, and so forth).

For example, in certain embodiments, the state machine engine 14 may provide cached state vector data (e.g., data stored by the state vector system 141) from the FSM lattice 30 to an external device. The external device may receive the state vector data, modify the state vector data, and provide the modified state vector data to the state machine engine 14 for restoring the FSM lattice 30 (e.g., resetting, initializing). Accordingly, the external device may modify the state vector data so that the state machine engine 14 may skip states (e.g., jump around) as desired.

The state vector cache memory 142 may receive state vector data from any suitable device. For example, the state vector cache memory 142 may receive a state vector from the FSM lattice 30, another FSM lattice 30 (e.g., via the IR bus and process buffer interface 136), the de-compressor 138, and so forth. In the illustrated embodiment, the state vector cache memory 142 may receive state vectors from other devices via the state vector memory buffer 144. Furthermore, the state vector cache memory 142 may provide state vector data to any suitable device. For example, the state vector cache memory 142 may provide state vector data to the state vector memory buffer 144, the state vector intermediate input buffer 146, and the state vector intermediate output buffer 148.

Additional buffers, such as the state vector memory buffer 144, state vector intermediate input buffer 146, and state vector intermediate output buffer 148, may be utilized in conjunction with the state vector cache memory 142 to accommodate rapid retrieval and storage of state vectors, while processing separate data sets with interleaved packets through the state machine engine 14. In the illustrated embodiment, each of the state vector memory buffer 144, the state vector intermediate input buffer 146, and the state vector intermediate output buffer 148 may be configured to temporarily store one state vector. The state vector memory buffer 144 may be used to receive state vector data from any suitable device and to provide state vector data to any suitable device. For example, the state vector memory buffer 144 may be used to receive a state vector from the FSM lattice 30, another FSM lattice 30 (e.g., via the IR bus and process buffer interface 136), the de-compressor 138, and the state vector cache memory 142. As another example, the state vector memory buffer 144 may be used to provide state vector data to the IR bus and process buffer interface 136 (e.g., for other FSM lattices 30), the compressor 140, and the state vector cache memory 142.

Likewise, the state vector intermediate input buffer 146 may be used to receive state vector data from any suitable device and to provide state vector data to any suitable device. For example, the state vector intermediate input buffer 146 may be used to receive a state vector from an FSM lattice 30 (e.g., via the IR bus and process buffer interface 136), the de-compressor 138, and the state vector cache memory 142. As another example, the state vector intermediate input buffer 146 may be used to provide a state vector to the FSM lattice 30. Furthermore, the state vector intermediate output buffer 148 may be used to receive a state vector from any suitable device and to provide a state vector to any suitable device. For example, the state vector intermediate output buffer 148 may be used to receive a state vector from the FSM lattice 30 and the state vector cache memory 142. As another example, the state vector intermediate output buffer 148 may be used to provide a state vector to an FSM lattice 30 (e.g., via the IR bus and process buffer interface 136) and the compressor 140.

Once a result of interest is produced by the FSM lattice 30, match results may be stored in a match results memory 150. That is, a "match vector" indicating a match (e.g., detection of a pattern of interest) may be stored in the match results memory 150. The match result can then be sent to a match buffer 152 for transmission over the bus interface 130 to the processor 12, for example. As previously described, the match results may be compressed.

Additional registers and buffers may be provided in the state machine engine 14, as well. For instance, the state machine engine 14 may include control and status registers 154. In addition, restore and program buffers 156 may be provided for use in configuring the SMEs 34, 36 of the FSM lattice 30 initially, or restoring the state of the SMEs 34, 36 in the FSM lattice 30 during analysis. Similarly, save and repair map buffers 158 may also be provided for storage of save and repair maps for setup and usage.

Figure 10:
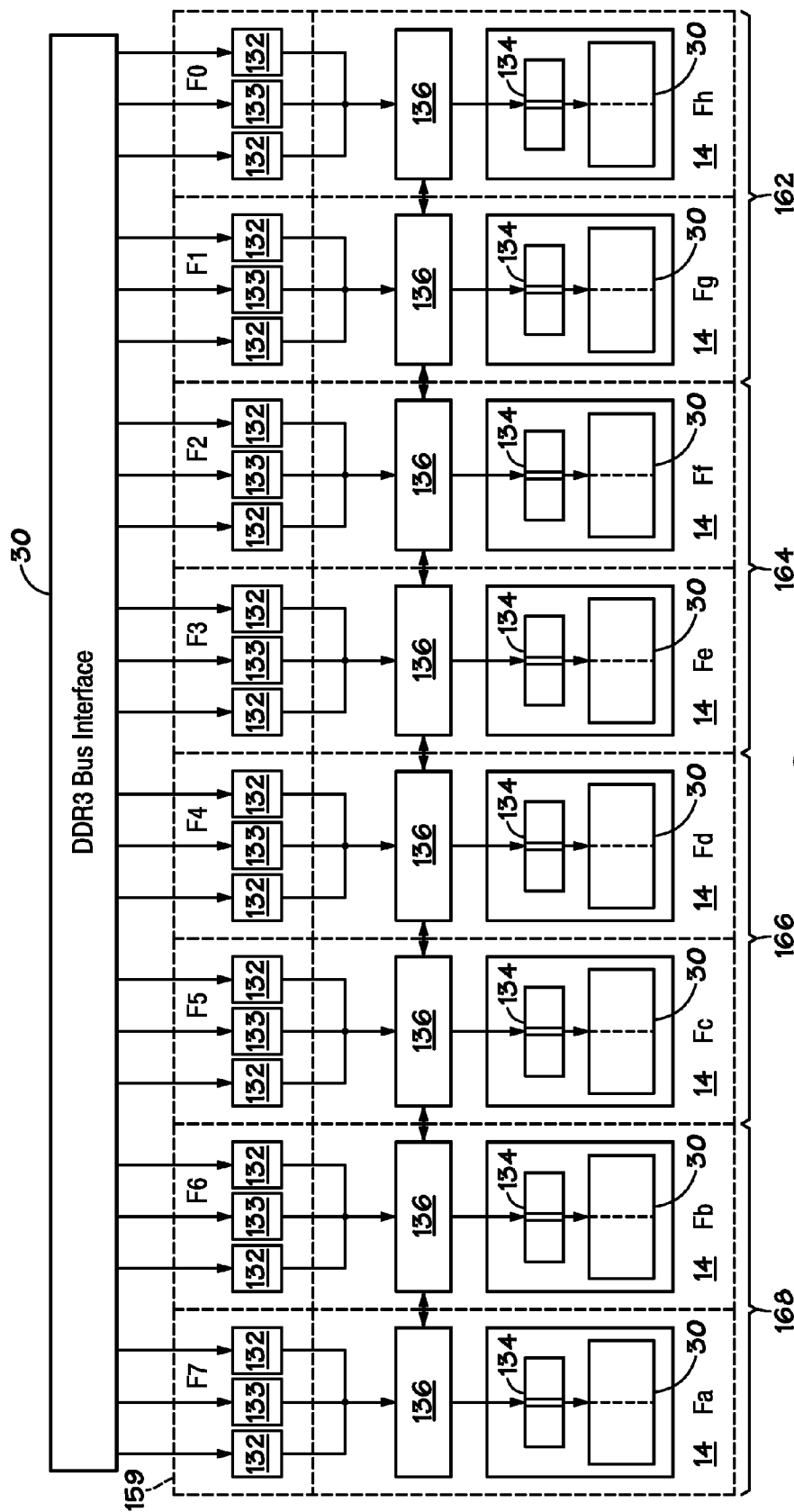
FIG. 10 illustrates an example of multiple physical state machine engines arranged in a rank of devices, according to various embodiments of the invention.

FIG. 10 illustrates an example multiple physical state machine engines 14 arranged in a rank of devices. As previously described, data to be analyzed is received at the bus interface 130. The bus interface 130 directs the data to a data buffer system 159 which includes the data buffers 132 and the instruction buffer 133 of each state machine engine 14 (e.g., F0, F1, F2, F3, F4, F5, F6, F7). The data buffers 132 are configured to receive and temporarily store data to be analyzed. In the illustrated embodiment, there are two data buffers 132 (e.g., data buffer A and data buffer B) in each state machine engine 14. Data may be stored in one of the two data buffers 132, while data is being emptied from the other data buffer 132, for analysis by an FSM lattice 30. As previously discussed, the instruction buffer 133 is configured to receive instructions from the processor 12 via the bus interface 130, such as instructions that correspond to the data to be analyzed. From the data buffer system 159, data to be analyzed and instructions that correspond to the data are provided to one or more of the FSM lattices 30 (e.g., Fa, Fb, Fc, Fd, Fe, Ff, Fg, Fh) via the IR bus and process buffer interface 136. In the present embodiment, the physical FSM lattices 30 are arranged into logical groups. Specifically, Fg and Fh are arranged into a logical group A 162, Fe and Ff are arranged into a logical group B 164, Fc and Fd are arranged into a logical group C 166, and Fa and Fb are arranged into a logical group D 168. Furthermore, as will be appreciated, data may be exchanged between the FSM lattices 30 and another device (e.g., FSM lattice 30) via the IR bus and process buffer interface 136. For example, the IR bus and process buffer interface 136 may be used to exchange data between any of the FSM lattices 30. Although eight state machine engines 14 are illustrated, the rank of devices may have any suitable number of state machine engines 14 (e.g., 1, 2, 4, 8, and so forth). As will be appreciated, the IR bus and process buffer interface 136 may include an input for receiving data (e.g., from the data buffer system 159 and the FSM lattices 30). Likewise, the IR bus and process buffer interface 136 may include an output for sending data (e.g., to the FSM lattices 30).

Figure 17:
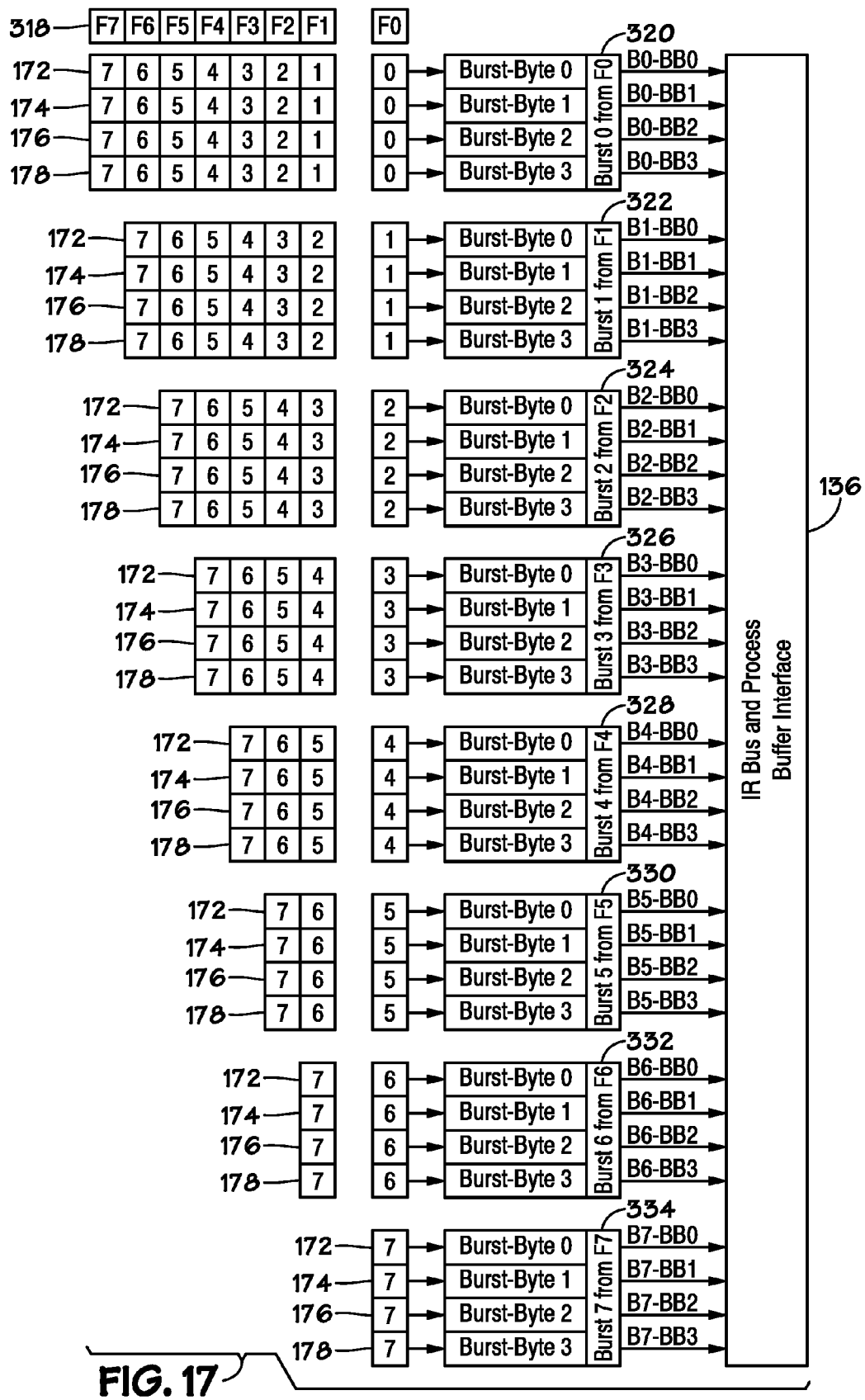
FIG. 17 illustrates an example of data being provided from a data buffer system to multiple FSM lattices, according to various embodiments of the invention.

The bus interface 130 may receive data to be analyzed in a format that is tailored for efficient use of the data. Specifically, FIGS. 11 to 14 illustrate examples of how data may be assigned (e.g., grouped) by the processor 12 into data blocks that are provided to the state machine engines 14 via the bus interface 130. Furthermore, FIGS. 15 to 17 illustrate examples of how data blocks may be received, stored, and provided via the data buffer system 159 of the state machine engines 14. FIG. 18 illustrates how data blocks may be received by the logical groups 162, 164, 166, and 168.

Figure 11:
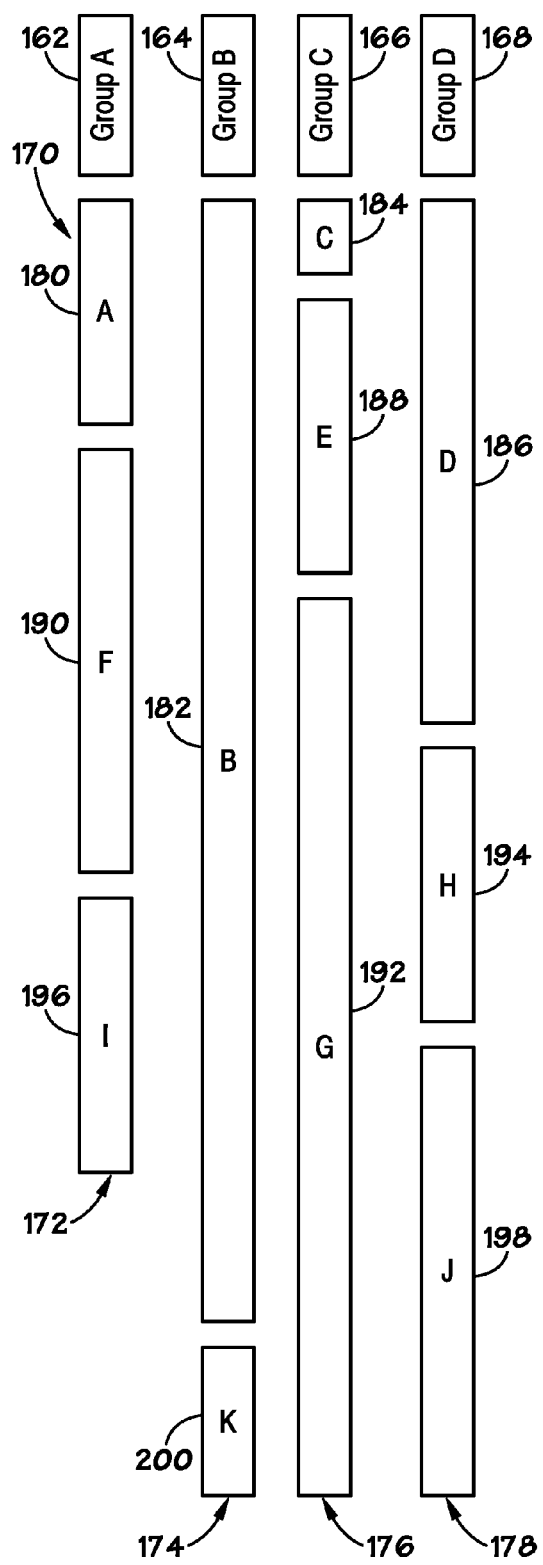
FIG. 11 illustrates an example of data segments grouped into data blocks to be provided to state machine engines, according to various embodiments of the invention.

Referring now to FIG. 11, an example of data segments (e.g., data set, search term) assigned by the processor 12 into data blocks to be provided to the state machine engines 14 is illustrated. In the present embodiment, multiple data segments are assigned into a single data block. Each data block is assigned to be analyzed by a single logical group of FSM lattices 30 (e.g., on one or more state machine engines 14 in a rank of state machine engines 14). For example, a data stream 170 (e.g., a large amount of data to be sent by the processor 12 to the state machine engines 14) is assigned by the processor 12 into: a first data block 172 that corresponds to data intended for the logical group A 162, a second data block 174 that corresponds to data intended for the logical group B 164, a third data block 176 that corresponds to data intended for the logical group C 166, and a fourth data block 178 that corresponds to data intended for the logical group D 168. Specifically, the data stream 170 is divided by the processor 12 into data segments 180, 182, 184, 186, 188, 190, 192, 194, 196, 198, and 200. As will be appreciated, each of the data segments 180, 182, 184, 186, 188, 190, 192, 194, 196, 198, and 200 may represent a data set to be analyzed by an FSM lattice 30. As will be appreciated, the processor 12 may assign data segments 180, 182, 184, 186, 188, 190, 192, 194, 196, 198, and 200 to the data blocks 172, 174, 176, and 178 for any suitable reason. For example, the processor 12 may assign data segments to certain data blocks based on a length of each data set and/or an order that data sets are to be analyzed in order to process the data sets efficiently.

The data segments 180, 182, 184, 186, 188, 190, 192, 194, 196, 198, and 200 may be assigned into the data blocks 172, 174, 176, and 178 using any suitable manner. For example, the data segments 180, 182, 184, 186, 188, 190, 192, 194, 196, 198, and 200 may be assigned into data blocks 172, 174, 176, and 178 such that a number of bytes in the data blocks 172, 174, 176, and 178 is minimized. As another example, the data segments 180, 182, 184, 186, 188, 190, 192, 194, 196, 198, and 200 may be assigned into data blocks 172, 174, 176, and 178 such that certain data segments are grouped together.

As illustrated, the first data block 172 includes the data segment A 180, the data segment F 190, and the data segment I 196. The second data block 174 includes the data segment B 182 and the data segment K 200. Furthermore, the third data block 176 includes the data segment C 184, the data segment E 188, and the data segment G 192. The fourth data block 178 includes the data segment D 186, the data segment H 194, and the data segment J 198.

As will be appreciated, to process the data blocks efficiently, the data blocks may all have an equal amount of data. Furthermore, the data segments within the data blocks may start and/or stop at predetermined intervals (e.g., bytes, words) within the data blocks so that processing devices can determine when data segments start and stop. However, the data segments may not have the correct amount of data to start and/or stop at the predetermined intervals. Accordingly, data padding may be inserted between certain data segments so that data starts and/or stops within the data blocks at the predetermined intervals. In addition, data padding may be added to the end of a data block so that all data blocks have an equal amount of data.

Figure 12:
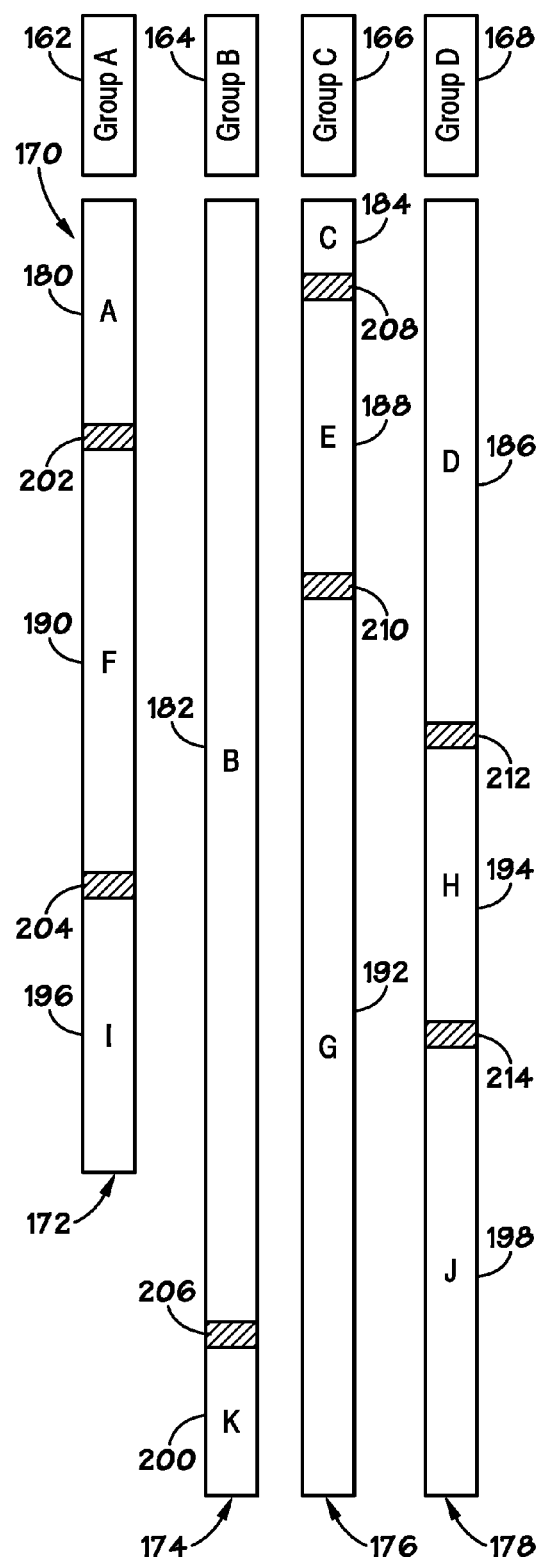
FIG. 12 illustrates an example of data padding inserted between the data segments of the data blocks of FIG. 11, according to various embodiments of the invention.

Referring now to FIG. 12, an example of data padding inserted between the data segments of the data blocks 172, 174, 176, and 178 of FIG. 11 is illustrated. For example, in the first data block 172, data padding 202 may be inserted between the data segment A 180 and the data segment F 190. Further, data padding 204 may be inserted between the data segment F 190 and the data segment I 196. As another example, in the second data block 174, data padding 206 may be inserted between the data segment B 182 and the data segment K 200. In the third data block 176, data padding 208 may be inserted between the data segment C 184 and the data segment E 188. Likewise, data padding 210 may be inserted between the data segment E 188 and the data segment G 192. As another example, in the fourth data block 178, data padding 212 may be inserted between the data segment D 186 and the data segment H 194. In addition, data padding 214 may be inserted between the data segment H 194 and the data segment J 198.

The data padding 202, 204, 206, 208, 210, 212, and 214 may include any suitable number of bytes of data that are not to be analyzed (e.g., invalid data, junk data, filler data, garbage data, etc.). In one embodiment, the number of bytes used as data padding may be a number of bytes that when added to a number of bytes of the prior data segment reach a whole word boundary (i.e., a number of bytes of the prior data segment plus the number of bytes used as data padding is equally divisible by the whole word boundary). For example, a number of bytes of the data padding 202 may be such that the combined number of bytes of the data padding 202 and the data segment A 180 (i.e., the prior data segment) is equally divisible (e.g., no remainder) by the whole word boundary. In the illustrated embodiment, the whole word boundary may be eight bytes. In other embodiments, the whole word boundary may be any suitable number of bytes or bits. As such, in the illustrated embodiment, if the data segment A 180 were to include 63 bytes of data, the data padding 202 would include one byte of data (e.g., to make 64 combined bytes of data between the data segment A 180 and the data padding 202, with 64 being equally divisible by eight bytes). As another example, if the data segment A 180 included 60 bytes of data (e.g., which is not equally divisible by eight), the data padding 202 would include four bytes of data. As a further example, if the data segment A 180 included 64 bytes of data, the data padding 202 would include zero bytes of data, or in other words the data padding 202 would not be needed between the data segment A 180 and the data segment F 190. As will be appreciated, each data padding 202, 204, 206, 208, 210, 212, and 214 may operate in a similar manner.

Figure 13:
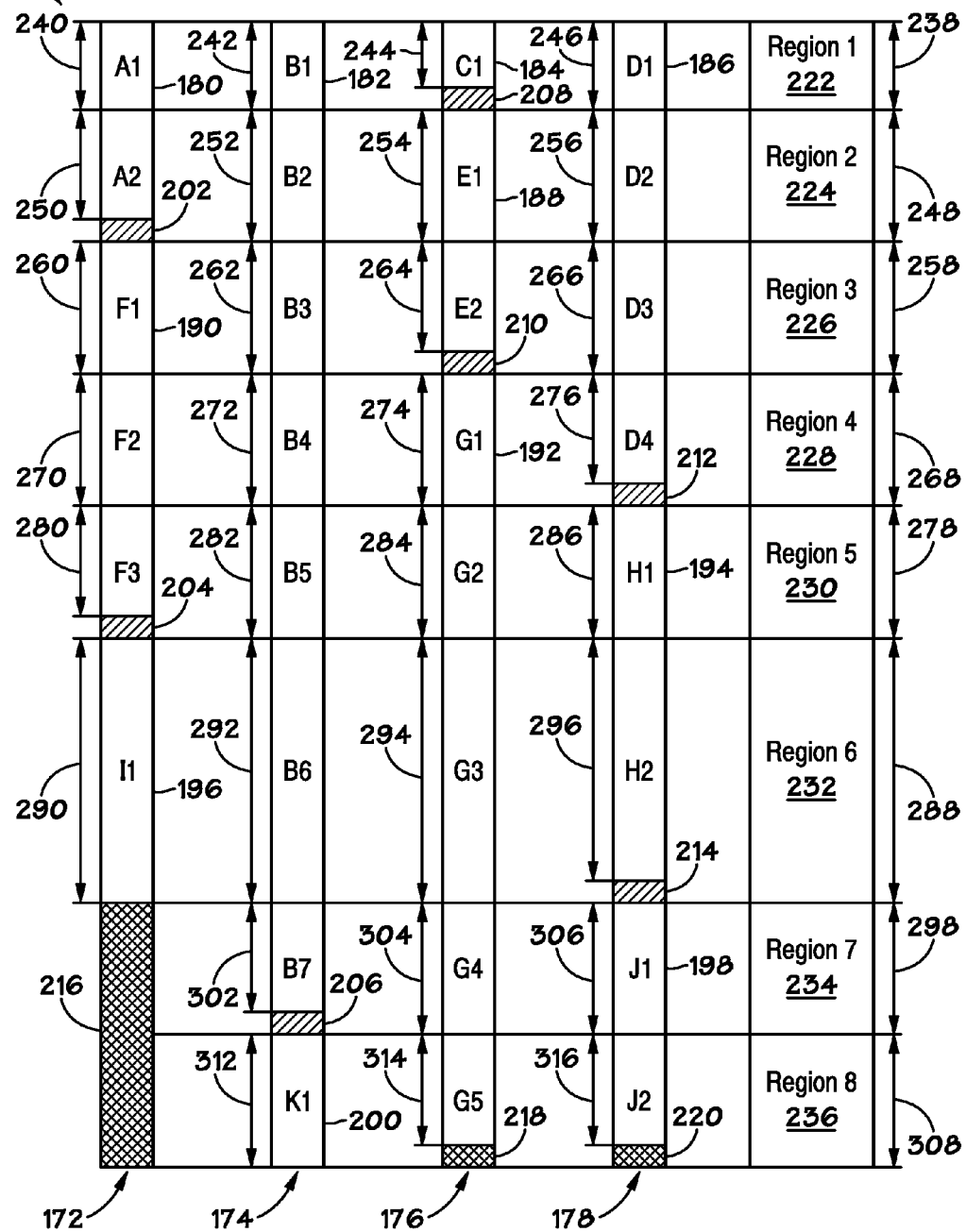
FIG. 13 illustrates an example of data padding inserted after data segments of the data blocks of FIG. 12, according to various embodiments of the invention

Referring now to FIG. 13, an example of data padding inserted after data segments of the data blocks 172, 174, 176, and 178 of FIG. 12 is illustrated. Specifically, data padding may be inserted at the end of each data block 172, 174, 176, and 178 as needed to make the number of bytes in each data blocks 172, 174, 176, and 178 equal. Furthermore, the data padding at the end of each data block 172, 174, 176, and 178 may be used so that each data block 172, 174, 176, and 178 reaches a whole word boundary as previously described. In the illustrated embodiment, data padding 216 is inserted after the data segment I 196, data padding 218 is inserted after the data segment G 192, and data padding 220 is inserted after the data segment J 198. Accordingly, each of the data blocks 172, 174, 176, and 178 includes an equal number of bytes and each of the data blocks 172, 174, 176, and 178 reaches a whole word boundary.

It may be difficult for FSM lattices 30 to distinguish data padding from valid data. Accordingly, instructions may accompany the data blocks 172, 174, 176, and 178 so that data padding may be identified and disregarded by the FSM lattices 30 during analysis of the valid data. Such instructions may be sent to the state machine engine 14 by the processor 12 via the bus interface 130 and may be received, stored, and provided by the instruction buffer 160 of the state machine engine 14. To produce the instructions, the processor 12 may logically divide the data stream 170 into regions 222, 224, 226, 228, 230, 232, 234, and 236. The end boundaries of the regions 222, 224, 226, 228, 230, 232, 234, and 236 may be formed such that each region ends when any data padding ends. For example, the first region 222 ends when the data padding 208 ends. As another example, the fifth region 230 ends when the data padding 204 ends.

The instructions that accompany the data blocks 172, 174, 176, and 178 may include a number of bytes for each region 222, 224, 226, 228, 230, 232, 234, and 236 and a number of valid bytes (e.g., the number of bytes excludes byte padding) for each data block 172, 174, 176, and 178 within each region. For example, the instructions may include: a number of bytes 238 that corresponds to the first region 222, a number of bytes 240 that corresponds to the valid bytes for the first data block 172 within the first region 222, a number of bytes 242 that corresponds to the valid bytes for the second data block 174 within the first region 222, a number of bytes 244 that corresponds to the valid bytes for the third data block 176 within the first region 222, and a number of bytes 246 that corresponds to the valid bytes for the fourth data block 178 within the first region 222.

Likewise, the instructions may include: numbers of bytes 248, 250, 252, 254, and 256 that correspond to the second region 224, numbers of bytes 258, 260, 262, 264, and 266 that correspond to the third region 226, numbers of bytes 268, 270, 272, 274, and 276 that correspond to the fourth region 228, numbers of bytes 278, 280, 282, 284, and 286 that correspond to the fifth region 230, numbers of bytes 288, 290, 292, 294, and 296 that correspond to the sixth region 232, numbers of bytes 298, 302, 304, and 306 that correspond to the seventh region 234, and numbers of bytes 308, 312, 314, and 316 that correspond to the eighth region 236. Accordingly, using the instructions, the FSM lattices 30 may identify the data padding inserted with the data segments. Although one specific type of instructions has been presented herein, it should be noted that the instructions included with the group of data blocks 172, 174, 176, and 178 may be any suitable group of instructions that allow the FSM lattices 30 to distinguish valid data from data padding (i.e., invalid data).

Figure 14:
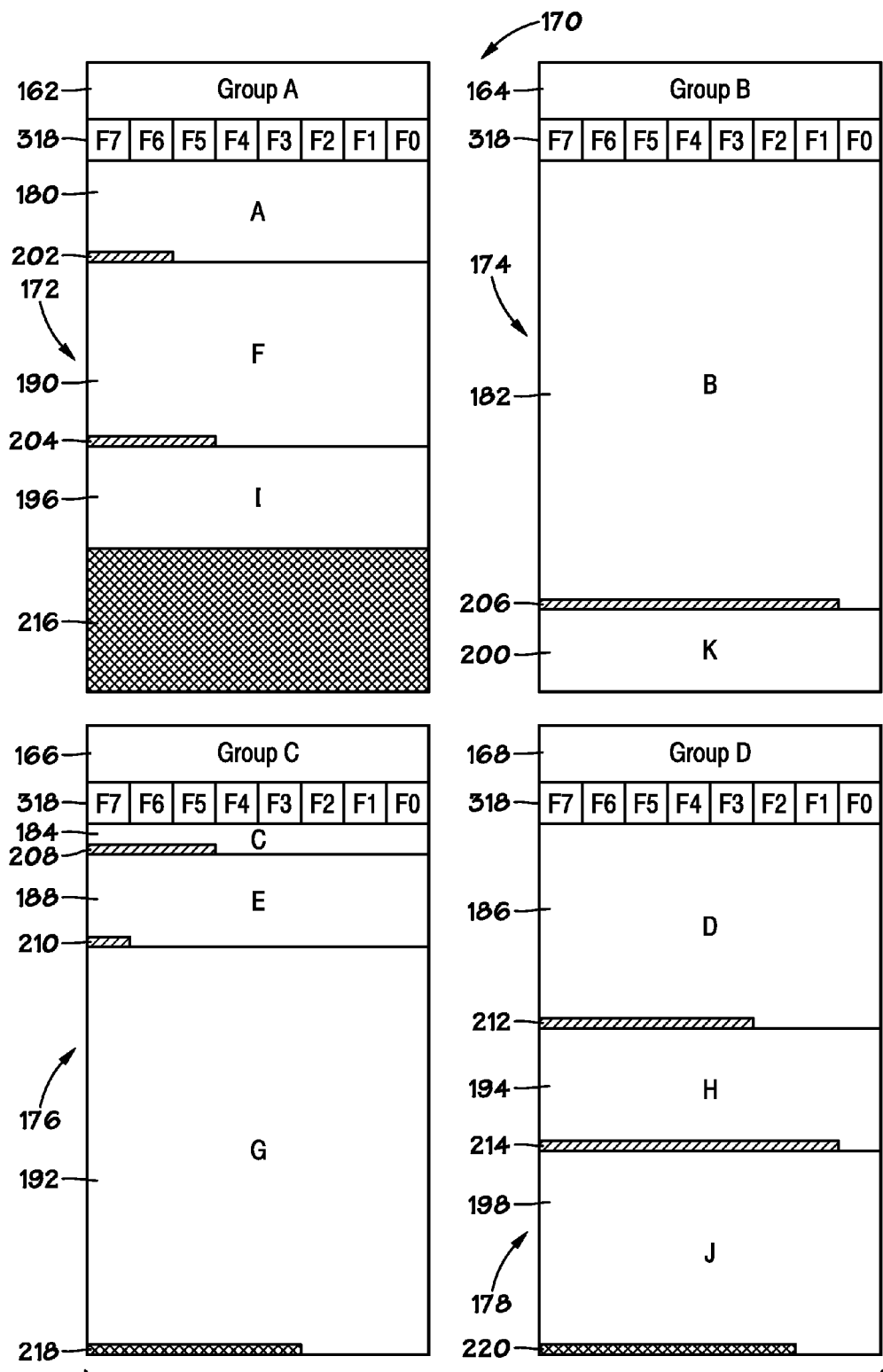
FIG. 14 illustrates an example of the data blocks of FIG. 13 organized for transmission to a data buffer system of state machine engines, according to various embodiments of the invention.

Referring now to FIG. 14, an example of the data blocks 172, 174, 176, and 178 of FIG. 13 organized by the processor 12 for transmission to data buffer system 159 of the state machine engines 14 is illustrated. Each of the data blocks 172, 174, 176, and 178 are arranged with rows of data having a number of bytes 318 equivalent to a whole word length. In the illustrated embodiment, the whole word length is eight bytes represented by a byte for each of state machine engines 14 (e.g., F0, F1, F2, F3, F4, F5, F6, and F7). The first byte from each of the data segments begins at the right side of each data block 172, 174, 176, and 178 and increase toward the left side of each data block such that the first byte for the data segment A 180 is in column F0 and the eighth byte for the data segment A 180 is in column F7. As will be appreciated, the column F0 represents data that will be initially stored in the data buffers 132 of the F0 state machine engine 14, the column F1 represents data that will be initially stored in the data buffers 132 of the F1 state machine engine 14, and so forth. Furthermore, the data segments are placed in rows from top to bottom. As illustrated, each combination of a data segment and data padding ends in column F7 (i.e., they each extend for a whole word length). Furthermore, each data block 172, 174, 176, and 178 is equal in size. As will be appreciated, during operation the data blocks 172, 174, 176, and 178 may be provided from the processor 12 to the state machine engines 14 sequentially.

The data from the data blocks 172, 174, 176, and 178 is arranged so that the data intended for the logical groups 162, 164, 166, and 168 is intermingled in the data buffer system 159 such that a portion of the data intended for each logical group 162, 164, 166, and 168 is intermingled within each state machine engine 14 (e.g., F0, F1, F2, F3, F4, F5, F6, and F7). The data may be received and stored in this manner to enable data to be quickly provided over the bus interface 130 to the data buffer system 159. In certain embodiments, the data buffers 132 of the data buffer system 159 may be configured to latch data from the bus interface 130 (e.g., at predetermined intervals). In other embodiments, the data buffers 132 of the data buffer system 159 may receive a limited portion of data based on the connection between the data buffers 132 and the bus interface 130. As explained in detail below, the intermingled data is sorted out when the data is provided from the data buffer system 159 to the process buffers 134 via the IR bus and process buffer interface 136.

Turning now to FIG. 15, an example of the data blocks 172, 174, 176, and 178 being received by the state machine engines 14 is illustrated. Specifically, the data buffer system 159 receives the first data block 172 followed by the second data block 174, the third data block 176, and the fourth data block 178. As discussed above, each of the data blocks 172, 174, 176, and 178 may be assigned by the processor 12 to be analyzed by a particular logical group 162, 164, 166, and 168. When the data buffer system 159 receives the data blocks 172, 174, 176, and 178, the data buffer system 159 stores data from the data blocks 172, 174, 176, and 178 into buffers in a systematic manner so that data will be provided from the data buffer system 159 to the FSM lattices 162, 164, 166, and 168 correctly.

Accordingly, FIG. 16 illustrates an example of how the data blocks 172, 174, 176, and 178 of FIG. 15 are stored in the data buffer system 159 of the state machine engine 14. In particular, data from the first data block 172 is stored in the first row of a buffer and every fourth row thereafter (e.g., rows 5, 9, 13, 17, etc.). Similarly, data from the second data block 174 is stored in the second row of the buffer and every fourth row thereafter (e.g., rows 6, 10, 14, 18, etc.). Further, data from the third data block 176 is stored in the third row of the buffer and every fourth row thereafter (e.g., rows 7, 11, 15, 19, etc.). In addition, data from the fourth data block 178 is stored in the fourth row of the buffer and every fourth row thereafter (e.g., rows 8, 12, 16, 20, etc.). It should be noted that some state machine engines 14 may include fewer than or more than four FSM lattices 162, 164, 166, and 168. Accordingly, in other embodiments, the data buffer system 159 may be configured to store data from data blocks in another manner. For example, in a state machine engine 14 with eight FSM lattices, a data block for the each FSM lattice may have data stored in one row of a buffer and every eighth row thereafter.

Referring now to FIG. 17, an example of data provided from the data buffer system 159 to multiple FSM lattices is illustrated. Specifically, data is provided out of the data buffer system 159 to the IR bus and process buffer interface 136 in data bursts. In one embodiment (e.g., where the number of bytes 318 in a whole word is eight bytes), eight data bursts are used to complete one IR bus cycle. Specifically, in a first data burst 320, four bytes from column F0 (e.g., a byte from each data block 172, 174, 176, and 178) are provided to the IR bus and process buffer interface 136. Similarly, in a second data burst 322, four bytes from column F1 (e.g., a byte from each data block 172, 174, 176, and 178) are provided to the IR bus and process buffer interface 136. In a third data burst 324, four bytes from column F2 (e.g., a byte from each data block 172, 174, 176, and 178) are provided to the IR bus and process buffer interface 136. Further, in a fourth data burst 326, four bytes from column F3 (e.g., a byte from each data block 172, 174, 176, and 178) are provided to the IR bus and process buffer interface 136. In a fifth data burst 328, four bytes from column F4 (e.g., a byte from each data block 172, 174, 176, and 178) are provided to the IR bus and process buffer interface 136. Similarly, in a sixth data burst 330, four bytes from column F5 (e.g., a byte from each data block 172, 174, 176, and 178) are provided to the IR bus and process buffer interface 136. In a seventh data burst 332, four bytes from column F6 (e.g., a byte from each data block 172, 174, 176, and 178) are provided to the IR bus and process buffer interface 136. Further, in an eighth data burst 334, four bytes from column F7 (e.g., a byte from each data block 172, 174, 176, and 178) are provided to the IR bus and process buffer interface 136. Accordingly, data is provided out of the data buffer system 159 to the IR bus and process buffer interface 136 in a systematic matter using data bursts.

Turning to FIG. 18, an example of data providing of the data bursts 320, 322, 324, 326, 328, 330, 332, and 334 into multiple logical groups 162, 164, 166, and 168 is illustrated. Specifically, in the illustrated embodiment, the process buffers 134 of the logical group A 162 (e.g., Fg, Fh) may be configured to latch the first byte of each data burst 320, 322, 324, 326, 328, 330, 332, and 334 provided onto the IR bus and process buffer interface 136. Similarly, the process buffers 134 of the logical group B 164 (e.g., Fe, Ff) may be configured to latch the second byte of each data burst 320, 322, 324, 326, 328, 330, 332, and 334 provided onto the IR bus and process buffer interface 136. In addition, the process buffers 134 of the logical group C 166 (e.g., Fc, Fd) may be configured to latch the third byte of each data burst 320, 322, 324, 326, 328, 330, 332, and 334 provided onto the IR bus and process buffer interface 136. The process buffers 134 of the logical group D 168 (e.g., Fa, Fb) may be configured to latch the fourth byte of each data burst 320, 322, 324, 326, 328, 330, 332, and 334 provided onto the IR bus and process buffer interface 136.

As will be appreciated, the process buffers 134 of the logical groups 162, 164, 166, and 168 may be configured to latch any byte or combination of bytes that have been provided onto the IR bus and process buffer interface 136. Further, the process buffer A and the process buffer B may be configured to latch the same or different bytes. In one embodiment, the state machine engines 14 may include fewer than or greater than two process buffers 134. In such an embodiment, each process buffer 134 may be configured to latch a specific byte that is provided (e.g., burst) onto the IR bus and process buffer interface 136. The process buffers 134 of the logical groups 162, 164, 166, and 168 may also be configured to receive instructions that accompany the data bursts from the data buffer system 159. By using the instructions, the process buffers 134 of the logical groups 162, 164, 166, and 168 may disregard data that corresponds to a difference between a total number of bytes in a data region and a total number of valid bytes in that data region.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A data analysis system, comprising:
a data buffer configured to receive data to be analyzed;
a state machine lattice comprising a plurality of configurable elements and each configurable element comprising a plurality of memory cells configured to analyze at least a portion of the data and to output a result of the analysis; and
a buffer interface configured to receive the data from the data buffer and to provide the data to the state machine lattice, wherein the data buffer is configured to provide data to the buffer interface via data bursts and each data burst comprises a predetermined portion of data for each of a plurality of state machine lattices.

2. The system of claim 1, wherein the data buffer comprises a first data buffer and a second data buffer, wherein each of the first and second data buffers are configured to receive data and to provide data to the buffer interface.

3. The system of claim 2, wherein the first data buffer is configured to receive data while the second data buffer provides data to the buffer interface, and wherein the second data buffer is configured to receive data while the first data buffer provides data to the buffer interface.

4. The system of claim 1, wherein the data buffer is configured to receive the data as data blocks and each data block corresponds to one of a plurality of state machine lattices.

5. The system of claim 4, wherein the data buffer is configured to receive one, two, four, or eight data blocks.

6. The system of claim 1, wherein the data buffer is configured to receive the data as groups of data blocks and each group of data blocks comprises a data block for each of the plurality of state machine lattices.

7. The system of claim 6, wherein the data buffer is configured to store a predetermined portion of each data block of a group of data blocks in an alternating pattern until each data block of the group of data blocks is stored, wherein the alternating pattern alternates between each data block.

8. The system of claim 7, wherein the predetermined portion of each data block comprises eight, sixteen, thirty-two, or sixty-four bytes of data.

9. The system of claim 1, wherein the predetermined portion of data comprises one, two, four, or eight bytes of data.

10. The system of claim 1, comprising one or more process buffers coupled to each of the plurality of state machine lattices, wherein each process buffer is configured to determine the predetermined portion of data from each data burst that corresponds to its respective state machine lattice.

11. The system of claim 1, wherein the data buffer comprises an instruction buffer configured to receive instructions that correspond to the data to be analyzed.

12. A data analysis system, comprising:
a plurality of state machine engines, each state machine engine comprising a state machine lattice having a plurality of data analysis elements, each data analysis element comprising a plurality of memory cells configured to analyze at least a portion of data and to output a result of the analysis;
a buffer interface coupled to each of the plurality of state machine engines and configured to receive the data and to provide the data to the plurality of state machine engines; and
a data buffer configured to receive the data to be analyzed and to provide the data to the buffer interface, wherein the data buffer is configured to receive the data as groups of data blocks, each group of data blocks comprising a data block for each of the plurality of state machine engines, wherein at least one of the data blocks comprises valid data combined with byte padding.

13. The system of claim 12, wherein the data buffer comprises an instruction buffer, and wherein the instruction buffer is configured to receive instructions that identify portions of data blocks that include byte padding.

14. The system of claim 12, wherein the data buffer is configured to receive a plurality of groups of instructions, and each group of instructions comprises data relating to a group of data blocks.

15. The system of claim 14, wherein each group of data blocks comprises a plurality of regions and each group of instructions comprises data relating to each of the plurality of regions.

16. The system of claim 15, wherein the data relating to each of the plurality of regions comprises a total number of bytes in the respective region and a total number of valid data bytes for each of the data blocks in the respective region.

17. The system of claim 16, wherein each of the plurality of state machine engines are configured to disregard data that corresponds to a difference between the total number of bytes and the total number of valid data bytes.

18. The system of claim 12, wherein the plurality of state machine engines comprises one, two, four, or eight state machine engines.

19. The system of claim 12, comprising a single logical group configured to analyze the data, the single logical group comprising the plurality of state machine engines.

20. The system of claim 12, comprising a plurality of logical groups configured to analyze the data, wherein each logical group of the plurality of logical groups comprises at least one of the plurality of state machine engines.

21. The system of claim 20, wherein each logical group of the plurality of logical groups is configured to receive the data and to analyze a predetermined portion of the data.

22. The system of claim 20, wherein each logical group of the plurality of logical groups is configured to receive the data and to analyze the data in parallel with other logical groups of the plurality of logical groups, and wherein the data analyzed by each logical group is the same.

23. The system of claim 12, wherein each state machine engine of the plurality of state machine engines is configured to analyze data assigned to the respective state machine engine.

24. The system of claim 12, wherein each state machine engine of the plurality of state machine engines is configured to latch a predetermined portion of a data burst provided to the buffer interface.

25. The system of claim 12, wherein the data buffer is configured to store the data in an offset manner and to provide the data to the buffer interface in a non-offset manner.

* * * * *